(12) United States Patent
Tetreault et al.

(10) Patent No.: US 8,234,380 B1
(45) Date of Patent: Jul. 31, 2012

(54) SINGLE COMMUNICATION CONNECTION FOR MANAGING A SYSTEM WITH MULTIPLE SERVICE PROCESSORS

(75) Inventors: Brian R. Tetreault, Framingham, MA (US); Timothy J. Cox, Mendon, MA (US); Mark A. Parenti, Milford, NH (US)

(73) Assignee: EMC Corporation, Hopkinton, MA (US)

( * ) Notice: Subject to any disclaimer, the term of this patent is extended or adjusted under 35 U.S.C. 154(b) by 446 days.

(21) Appl. No.: 12/286,427

(22) Filed: Sep. 29, 2008

(51) Int. Cl.
*G06F 15/173* (2006.01)
*G06F 15/16* (2006.01)

(52) U.S. Cl. ........ 709/226; 709/225; 709/208; 709/209; 709/210; 709/211

(58) Field of Classification Search .................. 709/225, 709/226, 208–211
See application file for complete search history.

(56) References Cited

U.S. PATENT DOCUMENTS

| | | | | |
|---|---|---|---|---|
| 5,201,054 A * | 4/1993 | Dudhela | ........................ | 709/230 |
| 6,073,255 A * | 6/2000 | Nouri et al. | ...................... | 714/31 |
| 6,327,579 B1 * | 12/2001 | Crawford | ...................... | 705/400 |
| 6,393,475 B1 * | 5/2002 | Leong et al. | .................... | 709/223 |
| 6,886,086 B2 * | 4/2005 | Kobayashi et al. | ........... | 711/162 |
| 7,051,097 B1 * | 5/2006 | Pecina | ........................ | 709/224 |
| 7,076,691 B1 | 7/2006 | Dobberpuhl et al. | | |
| 7,159,022 B2 * | 1/2007 | Primm et al. | .................. | 709/224 |
| 7,254,636 B1 * | 8/2007 | O'Toole et al. | ................ | 709/230 |
| 7,624,265 B1 * | 11/2009 | Slyva et al. | .................... | 713/168 |
| 2002/0165961 A1 * | 11/2002 | Everdell et al. | ............... | 709/225 |
| 2007/0168518 A1 * | 7/2007 | McCabe et al. | ............... | 709/226 |
| 2009/0106571 A1 * | 4/2009 | Low et al. | ...................... | 713/310 |

OTHER PUBLICATIONS

U.S. Appl. No. 12/286,442, filed Sep. 29, 2008, Tetreault, et al.

* cited by examiner

*Primary Examiner* — Emmanuel L Moise
*Assistant Examiner* — Edward Kim
(74) *Attorney, Agent, or Firm* — Muirhead and Saturnelli, LLC

(57) ABSTRACT

Described are techniques for processing data storage system management requests. A single one of a plurality of service processors of a data storage system is designated as an active service processor and a remainder of the plurality of service processors are passive service processors. Each of the service processors executes data storage system management server code including a web server. A data storage system management request is received from a client and is processed by the active service processor. When a first service processor currently designated as the active service processor becomes unhealthy, a second of said plurality of service processors which is designated as passive and is healthy is automatically selected as the active processor. Subsequent communications for data storage system management are transmitted over the network connection between the client and a web server executing on whichever service processor is currently designated as active.

18 Claims, 24 Drawing Sheets

SINGLE COMMUNICATION CONNECTION FOR MANAGING A SYSTEM WITH MULTIPLE SERVICE PROCESSORS

BACKGROUND

1. Technical Field

This application relates to using a single communication connection for use with managing a system having multiple service processors.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units, logical devices, or logical volumes (LVs). The logical disk units may or may not correspond to the actual disk drives. Allowing multiple host systems to access the single storage device unit allows the host systems to share data stored therein.

Different tasks may be performed in connection with a data storage system such as for data storage system management. A data storage system may include two service processors for processing I/O requests as well as management requests. Management requests may be issued from a client system by a user, such as a data storage administrator. Each of the service processors may have its own network address so that an external client can connect to each of the service processors using a different network address. The client may be issuing management requests to a first of the service processors and experience problems in connection with communicating with the first service processor. The user may be unable to use a network connection to communicate with the first service processor. In order to continue performing data storage system management and issue subsequent management requests, the user on the client system may manually take steps to communicate over the network with the remaining second service processor rather than the first service processor. As part of this process, the user must know or otherwise determine the network address of the second service processor. The user may establish a new communication connection to the second service processor using its network address. As part of taking steps to diagnose or correct problems with the first service processor, the user may communicate with the first service processor using a non-network or direct connection, such as a serial line, which may require the user to be in close physical proximity to the data storage system.

SUMMARY OF THE INVENTION

In accordance with one aspect of the invention is a method of processing data storage system management requests comprising: providing a data storage system including a plurality of service processors for processing data storage system management requests, each of said plurality of service processors executing data storage system management server code, said data storage system management server code including a web server; designating a single one of said plurality of service processors as an active service processor and a remainder of said plurality of service processors as passive service processors; and receiving, at said data storage system, a data storage system management request from a client on a network connection, said data storage system management request being processed by the active service processor, wherein, when a first service processor currently designated as the active service processor becomes unhealthy, a second of said plurality of service processors which is designated as passive and is healthy is automatically selected as the active processor replacing the first service processor, subsequent communications for data storage system management being transmitted over the network connection between the client and a web server executing on whichever service processor is currently designated as active. The first service processor may be healthy and the second service processor may be unhealthy and a first web server executing on said first service processor acts as a proxy for data storage system management requests directed to said second service processor. The method may also include sending a first data storage system management request for said second service processor to said first web server, wherein said first web server sends said first data storage system management request to a second web server executing on said second service processor. The first data storage system management request may be transmitted between the first service processor and the second processor using an inter-service processor communication connection of the data storage system. The second web server may be able to process a predetermined portion of data storage system management requests used to service said second service processor when said second service processor is unhealthy. Code executing on said first service processor may automatically forward, to the second service processor, received data storage system management requests that are directed to said second service processor. In response to receiving a data storage system management request directed to said second service processor, code executing on said first service processor may issue instructions to said second service processor in accordance with the data storage system management request directed to the second service processor to cause said second service processor to execute a command in the data storage system management request directed to the second service processor. Each service processor that is healthy may execute a first instance of a first type of web server, and wherein each service processor that is unhealthy may execute a second instance of a second type of web server. The second type of web server may be able to process only a portion of a set of commands and the first type of web server may be able to process said set of commands. The portion may include commands used to diagnose problems on an unhealthy service processor and take corrective actions to transition a service processor which is in an unhealthy state to a healthy state. The portion may include a first command to collect information regarding a service processor on which said second instance is executing, a second command to reboot the service processor on which said second instance is executing, a third command to re-image code used by the service processor on which said second instance is executing, and a fourth command to perform reinitialization in connection with the data storage system management server code executing on the service processor on which the second instance is executing. The first service processor may be healthy and said second service processor may be unhealthy, and a first web server of said first type executing on said first service processor may act as a proxy for data storage system management requests directed to said second service processor. The first web server may communicate with a second web server of said second type executing on said second service processor. If each of the plurality of service processors is unhealthy, one of the plurality of service processors that is unhealthy may be designated as the active service processor and may communicate with the client until one of the plurality of service processors becomes healthy. A service processor may be determined as healthy in accordance with one or more criteria, a service processor determined as healthy being able to service a set of expected data storage system management requests over the network connection used for data storage management. The one or more criteria for determining whether a service processor is healthy may include at least one of: whether a web server of a first type which is able to service any request in the set is executing on is loaded and running on the service processor, whether the web server of the first type is able to successfully communicate over an external network connection which is said network connection used for data storage system management transmissions, whether data storage system management server code executing on the service processor is able to communicate with other peer service processors using an inter-service processor communication connection of the data storage system, and whether code for proxying to a peer service processor executing on the service processor.

In accordance with another aspect of the invention is a computer readable medium comprising executable code stored thereon for processing data storage system management requests, the computer readable medium comprising executable code for: designating a single one of a plurality of service processors as an active service processor and a remainder of said plurality of service processors as passive service processors, said plurality of service processors being included in a data storage system, said plurality of service processors processing data storage system management requests, each of said plurality of service processors executing data storage system management server code, said data storage system management server code including a web server; and receiving, at the data storage system, a data storage system management request from a client on a network connection, said data storage system management request being processed by the active service processor, wherein, when a first service processor currently designated as the active service processor becomes unhealthy, a second of said plurality of service processors which is designated as passive and is healthy is automatically selected as the active processor replacing the first service processor, subsequent communications for data storage system management being transmitted over the network connection between the client and a web server executing on whichever service processor is currently designated as active. The first service processor may be healthy and said second service processor may be unhealthy and a first web server executing on said first service processor may act as a proxy for data storage system management requests directed to said second service processor. A first data storage system management request for said second service processor may be received by said first web server and first web server may send said first data storage system management request to a second web server executing on said second service processor. The first data storage system management request may be transmitted between the first service processor and the second processor using an inter-service processor communication connection of the data storage system. The second web server may be able to process a predetermined portion of data storage system management requests used to service said second service processor when said second service processor is unhealthy. Each service processor that is healthy may execute a first instance of a first type of web server, and each service processor that is unhealthy may execute a second instance of a second type of web server. The second type of web server may be able to process only a portion of a set of commands and the first type of web server being able to process said set of commands.

In accordance with another aspect of the invention is a method for processing data storage system management requests comprising: designating a single one of a plurality of service processors as an active service processor and a remainder of said plurality of service processors as passive service processors, said plurality of service processors being included in a data storage system, said plurality of service processors processing data storage system management requests, each of said plurality of service processors executing data storage system management server code, said data storage system management server code including a web server; and receiving, at the data storage system, a data storage system management request from a client on a network connection, said data storage system management request being processed by the active service processor, wherein, when a first service processor currently designated as the active service processor becomes unhealthy, a second of said plurality of service processors which is designated as passive and is healthy is automatically selected as the active processor replacing the first service processor, subsequent communications for data storage system management being transmitted over the network connection between the client and a web server executing on whichever service processor is currently designated as active.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
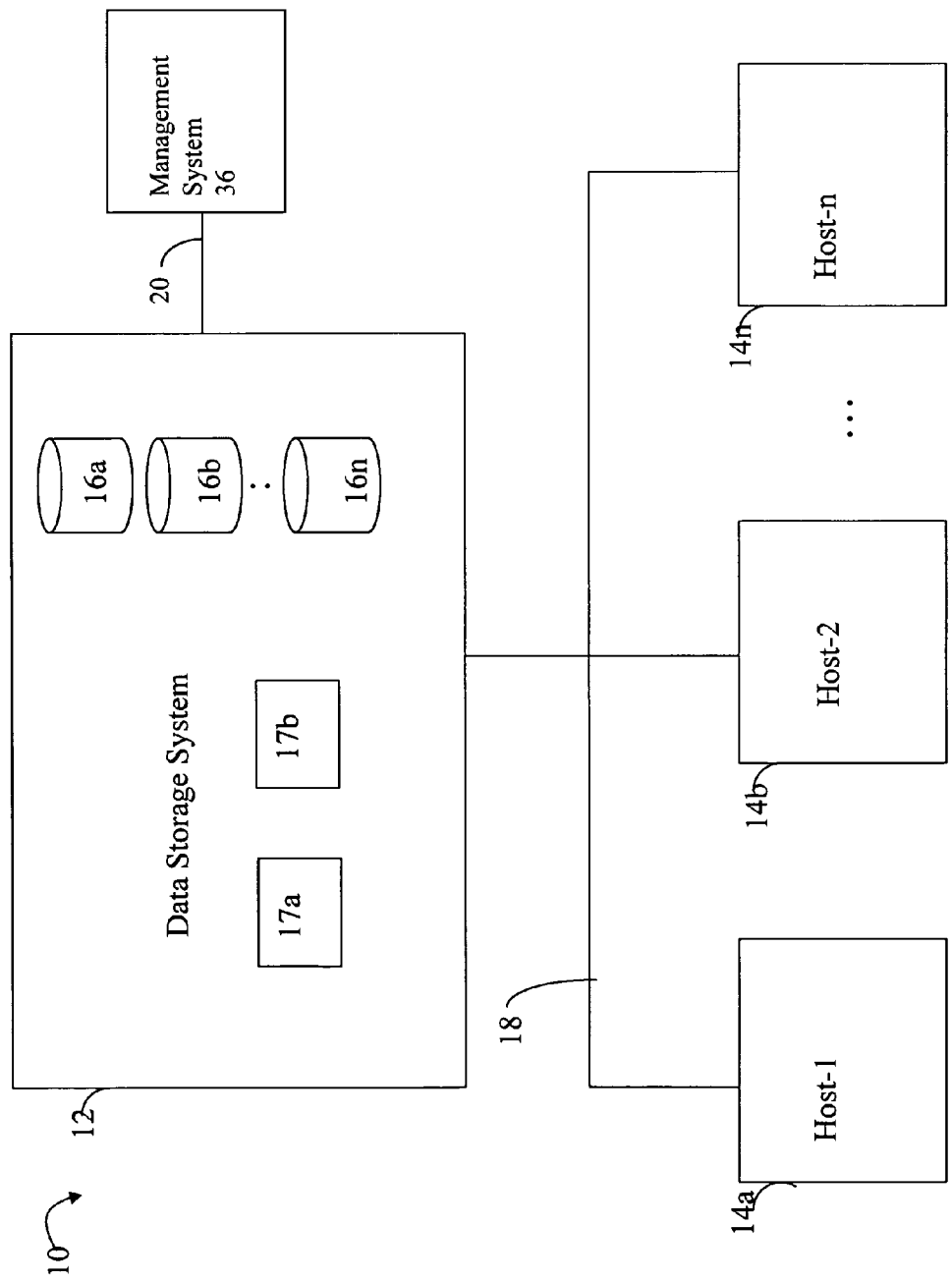
FIG. 1 is an example of an embodiment of a system that may utilize the techniques described herein.

Referring to FIG. 1, shown is an example of an embodiment of a system that may be used in connection with performing the techniques described herein. The system 10 includes a data storage system 12 connected to host systems 14a-14n through communication medium 18. The system 10 also includes a management system 36 connected to one or more data storage systems 12 through communication medium 20. In this embodiment of the system 10, the n hosts 14a-14n may access the data storage system 12 using communication medium 18, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10. In one embodiment, the communication medium 20 may be a LAN connection and the communication medium 18 may be an iSCSI or fibre channel connection.

Each of the host systems 14a-14n and the data storage system 12 included in the system 10 may be connected to the communication medium 18 by any one of a variety of connections as may be provided and supported in accordance with the type of communication medium 18. Similarly, the management system 36 may be connected to the communication medium 20 by any one of variety of connections in accordance with the type of communication medium 20. The processors included in the host computer systems 14a-14n and management system 36 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n, management system 36, and data storage system may all be located at the same physical site, or, alternatively, may also be located in different physical locations. Examples of the communication medium that may be used to provide the different types of connections between the host computer systems and the data storage system, and between the data storage system and the management system of the system 10 may use a variety of different communication protocols such as SCSI, Fibre Channel (FC), iSCSI, and the like. Some or all of the connections by which the hosts, management system, and data storage system may be connected to the communication mediums may pass through other communication devices, such as a Connectrix or other switching equipment that may exist such as a phone line, a repeater, a multiplexer or even a satellite. In one embodiment, the hosts may communicate with the data storage systems over an iSCSI or fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array, such as a CLARiiON® data storage array by EMC Corporation of Hopkinton, Mass., including a plurality of data storage devices 16a-16n and a plurality of service processors 17a, 17b. The data storage devices 16a-16n may include one or more types of data storage devices such as, for example, one or more disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts. The service processors 17a, 17b may be computer processing units included in the data storage system for processing requests and commands.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices or logical volumes (LVs). The LVs may or may not correspond to the actual physical devices or drives 16a-16n. For example, one or more LVs may reside on a single physical drive or multiple drives. Data in a single data storage system, such as a single data storage array, may be accessed by multiple hosts allowing the hosts to share the data residing therein.

In an embodiment of the data storage system, the data storage devices 16a-16n may include a combination of disk devices and flash devices in which the flash devices may appear as standard Fibre Channel drives to the various software tools used in connection with the data storage array. The disk devices may be any one or more different types of disk devices such as, for example, an ATA disk drive, FC disk drive, and the like. The flash devices may be constructed using different types of memory technologies such as non-volatile semiconductor NAND flash memory forming one or more SLC (single level cell) devices and/or MLC (multi level cell) devices. Additionally, flash memory devices and disk devices are two exemplary types of devices that may be included in a data storage system used in connection with the techniques described herein.

In connection with performing techniques herein, an embodiment of the data storage system may include multiple service processors. Such a data storage system is the CLARiiON® data storage system mentioned above which may include two service processors 17a, 17b for performing processing in connection with servicing requests. Additionally, the two service processors may be used in connection with failover processing when communicating with the management system 36. Client software on the management system 36 may be used in connection with performing data storage system management by issuing commands to the data storage system 12 and/or receiving responses from the data storage system 12 over connection 20.

In one embodiment, the management system 36 may be lap top or desk top computer system.

Figure 2:
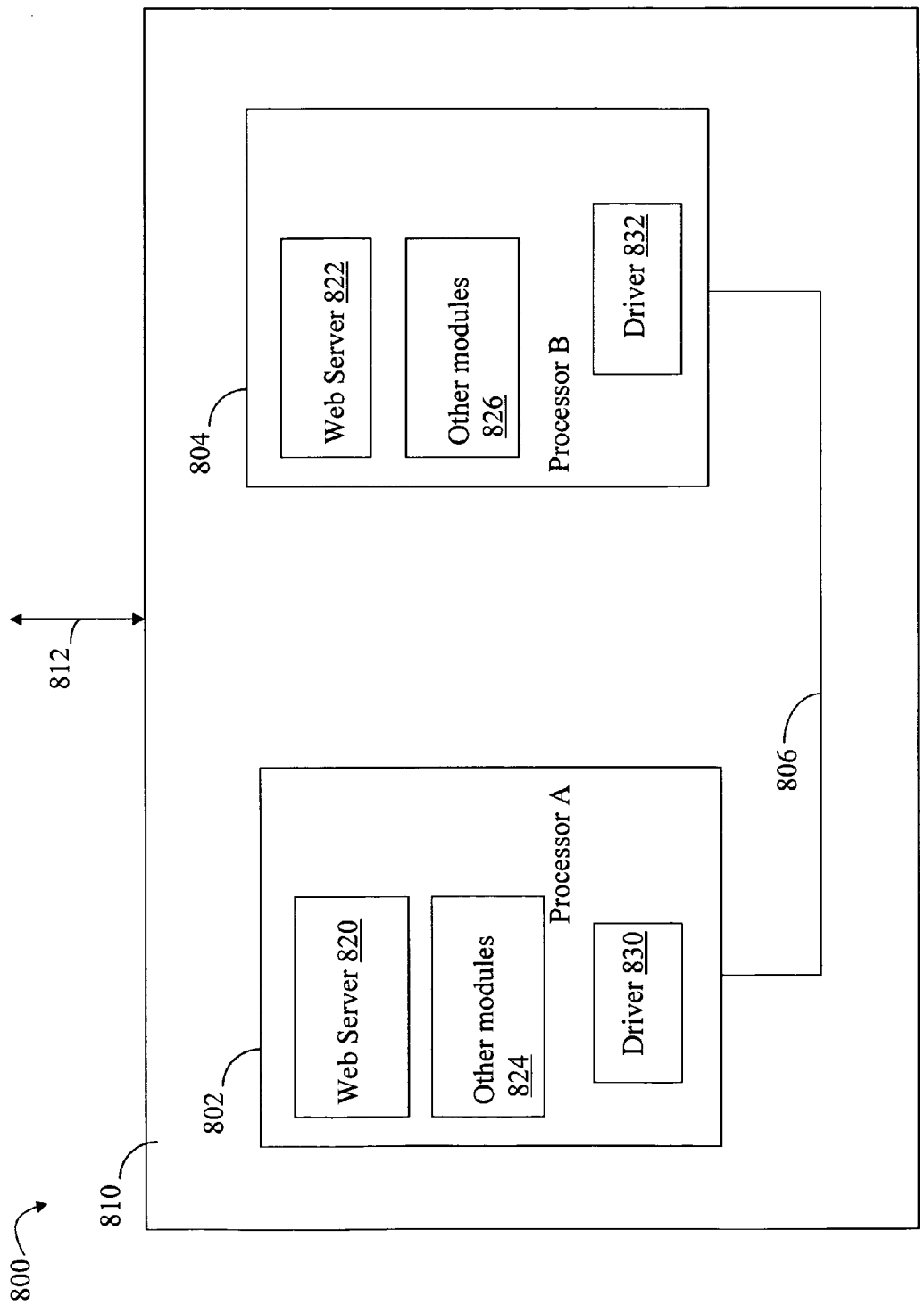
FIGS. 2 and 3 are examples illustrating additional detail regarding components that may be included in an embodiment using the techniques herein.

Referring to FIG. 2, shown is a block diagram of components that may be included in a data storage system 810. In the example 800, there are two service processors 802, 804 although a data storage system and techniques herein may be used in an embodiment in which the data storage system includes more than two service processors. Service processor 802 includes a web server 820, other modules 830, and driver 830. Service processor 804 includes a web server 822, other modules 826, and driver 832. Service processor 802 and 804 may communicate using 806 which is described in more detail below. Element 812 may represent a single logical communication connection used for data storage system management transmissions between the data storage system 810 and one or more external clients. The web servers 820 and 822 may be software modules included in data storage system management software residing and executing on the data storage system 810. The web servers 820 and 822 may be used in connection with communicating with external clients over network connection 812.

The two service processors may control the operation of the data storage system. The processors may be configured to process requests as may be received from the hosts, other data storage systems, management system, and other components connected thereto. Each of the processors 802, 804 may process received requests and operate independently and concurrently with respect to the other processor. In the example 800, each processor is illustrated as having one or more software modules (e.g., web server, other modules, driver) executing thereon. An embodiment may have a same set of one or more software modules executing on each processor so that either of the processors may service a received request. The example 800 may illustrate the state of the data storage system with software modules that are loaded as a result of booting the data storage system. In the example 800, the processors 802 and 804 have successfully completed the boot process leaving both 802 and 804 in what may be characterized as a healthy state with respect to data storage system management functionality. A service processor may be characterized as being in the healthy state if the service processor has the ability to service normal data storage system management messaging traffic over a communication connection, such as a network connection, used for data storage management. For example, a processor may be characterized as being in a healthy state if, after completion of the boot process, it is determined that the processor was able to load and start the necessary software for data storage system management, is able to communication with its peer processor as well as with external components using the management software over the network connection, and the like. In other words, a processor may be characterized as healthy if it is determined that the processor is able to perform necessary processing and communications in connection with handling typical data storage system management transmissions over a connection used for normal data storage management messaging traffic. A processor may otherwise be characterized as being in an unhealthy state if any deficiency is determined with respect to the foregoing, such as a hardware and/or software problem, so that the processor is unable to be used in connection with handling data storage system management transmissions. Once booted, a processor may transition between the states of healthy and unhealthy in accordance with problems that may occur and/or be corrected over time.

With respect to data storage management requests, operations, and the like, as may be received from a client, such as the management system 36 of FIG. 1 in connection with the techniques herein, the client may interact with a designated one of the two processors 802, 804 over the communication connection 812. The designated one of the processors may be characterized as the master with the other processor designated as the slave.

In connection with techniques herein, the web server may operate in accordance with a master-slave or active-passive model when communicating with the management system 36. In accordance with the master-slave model, only one instance of the web server is active at a time so that one of the processors 802, 804, and the instance of the web server executing thereon, are designated as a "master" with the other processor and web server instance thereon designated as the "slave".

It should be noted that as used herein, the terms "active" and "master" may be used interchangeably to refer to the designated active or master processor in the master-slave or active-passive model. Similarly, the terms "slave" or "passive" may be used interchangeably to refer to the one or more processors other than the active or master processor in accordance with the master-slave or active-passive model.

In the example 800, instances of the web server 820, 822 executing, respectively, on processors 802, 804 may communicate over connection 806 using lower-level components, such as drivers 830, 832. The connection 806 may be a bus or other communication connection to facilitate inter-processor communication between the drivers. The connection 806 may be characterized as internal to the data storage system or local with respect to residing on the data storage system and used for communicating between components on the data storage system. The connection 806 may be characterized as part of an internal network over which inter-processor communications may occur. Thus, one of the SPs may use connection 806 to communication with the other SP. As will be described in more detail in following paragraphs, each SP may include code which facilitates communication with the other SP using the connection 806 for inter-SP communication. In particular, code of an SP may use connection 806 to instruct the other peer SP to perform commands such as for data storage system management of the other SP.

The processors 802, 804 may also communicate over another connection 812. The connection 812 may represent a TCP/IP or other network connection over which instances of the web server 820, 822 on processors 802, 804 may communicate with other externally networked components. Connection 812 may correspond to a single logical connection used, for example, to communicate with a client such as the management system 36 running the web browser displaying a GUI (graphical user interface). The connection 812 may be characterized as the single communication connection between the data storage system and the management system over which the user on the management system 36 interacts with the data storage system in performing data storage system management tasks. The processors 802, 804 may send and/or receive transmissions over connection 812 from the management system 36 of FIG. 1. In one embodiment, the connection 812 may be part of a dedicated LAN connection for management operations. Host I/O requests may be received at the data storage system on different incoming ports such as, for example, Fibre channel or iSCSI ports not illustrated.

Only one of the processors 802, 804 is designated as active or the master at any time. Thus, at any point in time, at most one web server of the active or master service processor communicates with a client in connection with handling data storage system management transmissions over the single connection 812. In the event that an active master processor transitions from a healthy to an unhealthy state, the passive slave processor assumes the role of master if it is in a healthy state. In connection with techniques herein, when failover processing results in a processor assuming the role of master, the web server thereon may also be designated as the web server instance which is active and communicates with the client. As described herein, a processor may be characterized as having an unhealthy state if the web server thereon is not able to communicate with the external client, such as the management system 36, over a network. Detection of the state of a processor and web server as healthy or unhealthy may be performed using a variety of different techniques such as, for example, by the processor itself and/or its peer processor. Such techniques may include, for example, periodically having each processor test communications with the other processor over connections 806, determining a status regarding the web server on a service processor and its ability to communicate over the external communication connection used for data storage system management transmissions, receiving a notification regarding status of a peer processor, and the like.

Techniques are described, for example, in U.S. Pat. No. 7,076,691, (the '691 patent) Dobberpuhl, et al., issued Jul. 11, 2006, ROBUST INDICATION PROCESSING FAILURE MODE HANDLING, which is incorporated by reference herein, which may be used in connection with detection and determination of a master SP. It should be noted that although the '691 patent describes an environment in which each processor has its own external network address, the techniques therein may be used in an embodiment as described herein where there is a single external network connection for use in connection with data storage system management traffic between the data storage system and external clients connected via the network.

The connection 812 may have a single network address, such as an IP address, over which the active processor and code executing thereon may communicate with the management system 36 in connection with performing the techniques herein. The other modules 824 and 826 may represent other code as described herein in more detail on each of the processors. It should be noted that the data storage system 810 of the example 800 includes other components, such as storage devices, which are omitted from the example 800 for simplicity in illustrating the dual processors 802, 804.

Described in following paragraphs are techniques that use a single communication connection between a data storage system having multiple service processors in connection with performing data storage system management from a client, such as using software executing on the management system 36 of FIG. 1. In connection with techniques herein in an embodiment in which the data storage system includes two service processors as described in connection with FIG. 2 and following paragraphs, the master service processor is able to handle its own requests and may also act as a proxy for its peer processor when appropriate to facilitate performing operations on the peer processor.

Figure 3:
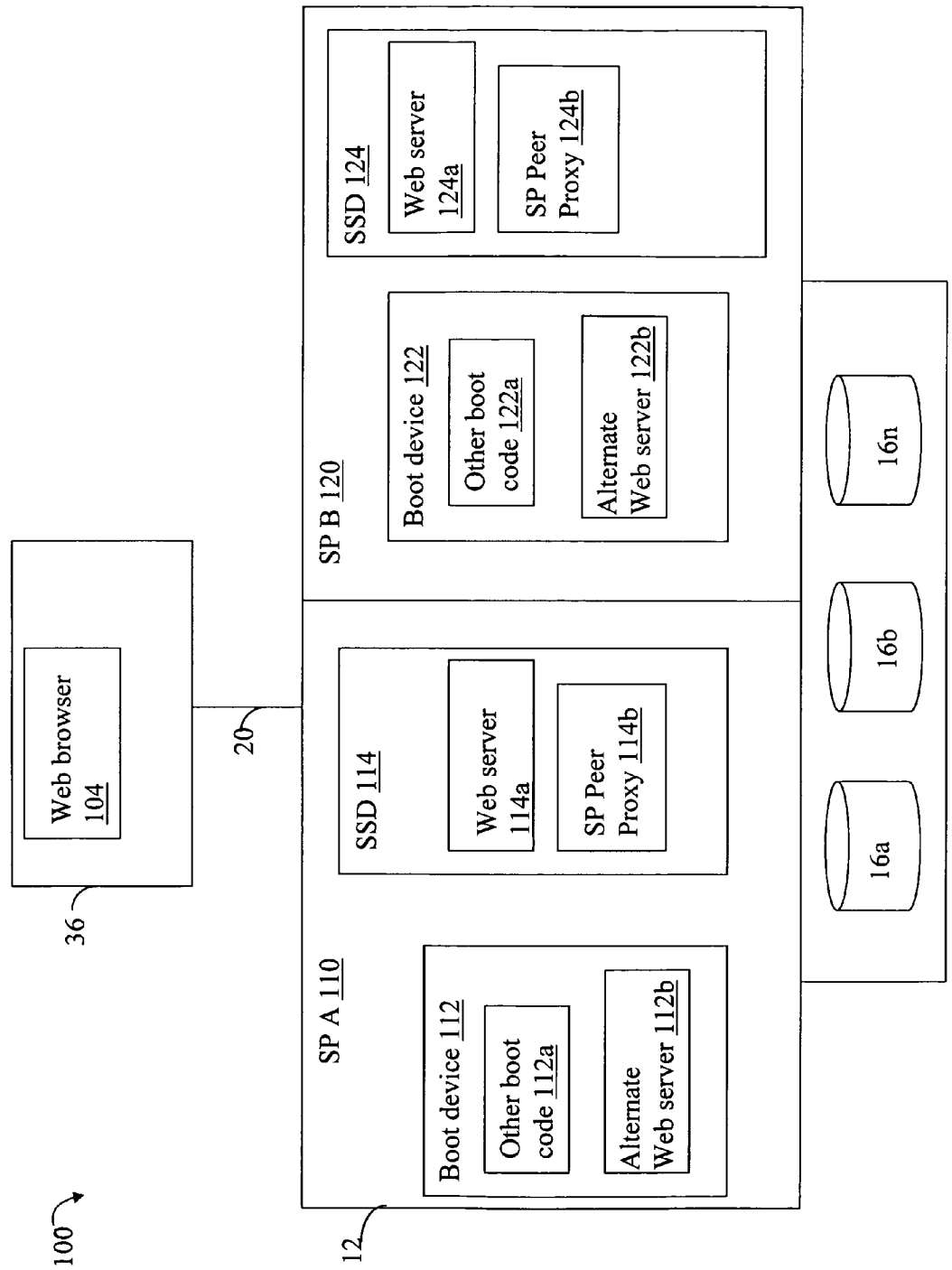

Referring to FIG. 3, shown is an example illustrating in more detail an embodiment of the data storage system that may be used in connection with the techniques herein. As described above in connection with FIG. 1, the data storage system 12 may communicate with the management station 26 over a single communication connection 20 used for data storage system management transmissions. The data storage system 12 may include a first service processor, SP A 110, and second service processor, SP B 120. SP A 110 may include a boot device 112 and an SSD (solid state device) 114, both of which include code stored thereon. It should be noted that although particular devices are illustrated, the code may be generally stored on any type of device from which code can be retrieved and used in connection with a service processor performing the techniques herein.

The management system 36 may include code executing thereon which is client software for performing data storage system management. The client software may execute in the context of a web browser. The client portion of the data storage system management may include, for example, scripts and other code that may be downloaded from the data storage system 12, code loaded from a local device of the system 36, and the like. The data storage system management client executing on the system 36 may issue commands in the form of requests to a server portion of the data storage system management software. One or more responses may be returned to the client issuing the request. As will be described in more detail, the server portion of the data storage system management software executing in the data storage system 12 may include a web server which interfaces and communicates with the client software on the system 36. In one embodiment, the data storage system management client software executing on the system 26 may be a GUI.

The SSD 114 may include code for a web server (WS) 114a and SP peer proxy code 114b. In one embodiment, the code 114b may be implemented as a plugin code module for the WS. A plugin code module may be defined as a code module which extends or adds to the functionality provided by the WS. The boot device 112 may include code used in connection with booting SP A 110. The boot device 112 may include code for an alternate web server (AWS) 112b and other boot code 112a. The WS 114a may be used to facilitate communications with the web browser 104 to perform data storage management operations. In an embodiment described herein, code of the SP peer proxy 114b may be used to facilitate communications with SP B 120 when SP A 110 is the healthy master or active processor and SP B 120 is in an unhealthy state. Other boot code 112a may include code which is executed as part of booting SP A 110. As part of the boot process, code of 112a may attempt to load and start execution of WS 114a. If it is determined by code of 112a that the boot process was unable to load and start execution of WS 114a, or that WS 114a is otherwise unable to communicate and handle expected transmissions over the external connection 20 for server processing in connection with data storage system management operations, the other boot code 112a may load and start execution of the AWS 112b. The AWS 112b may be characterized as an alternate web server which may be used as an alternative to the WS 114a when problems occur with the WS 114a. Thus, the boot code 112a may perform processing to make an initial determination as to whether an SP is in a state of healthy or unhealthy. Problems may occur with loading and starting execution of an instance of the WS 114a for a variety of reasons such as, for example, code of 114a is corrupted, there is a hardware problem with the SSD 114, and the like. As a result of the boot process, a state of healthy (H) or unhealthy (U) is determined for SP A 110 with respect to WS 114a. WS 114a may be included in data storage management software which is used in communicating with client software on the system 36. If the boot process completes and determines that SP A meets the criteria for a healthy state with respect to data storage system management communications and transmissions (e.g., is able to load an instance of WS 114a, WS 114a is able to communicate with its peer processor, SP B and the system 36, and the like), SP A 110 may be determined to be healthy. Otherwise, SP A 110 may be determined to be unhealthy. Thus, if SP A 110 is determined to not meet the criteria for the healthy state, an instance of the AWS 112b is started and SP A 110 is determined to be unhealthy. It should be noted that an embodiment may also use other criteria in connection with making a determination as to whether each SP is healthy or unhealthy depending on the particular aspects that may affect the ability of an SP of the data storage system to handle data storage system management transmissions over the external network communication connection 20.

The AWS 112b may be able to perform a reduced set of operations on the SP A 110. The AWS 112b may provide a reduced set of functionality with respect to data storage system management operations that may be performed in connection with servicing an unhealthy SP. With respect to SP A 110, the AWS 112b may be able to perform operations for collecting information as may be used in diagnosing or analyzing problems, rebooting SP A, re-imaging WS 114a, and reinitializing SP A 110. The information collected may include, for example, log files about errors, device status, and the like, as may be used in diagnosing why SP A 110 is in an unhealthy state. Other operations, such as re-imaging and rebooting WS 114a and/or reinitializing, may be performed as part of corrective actions taken to place SP A 110 in a healthy state. Reinitialization may include reinitializing in-memory data structures, configuration information, and the like, as may be used by data storage management server software on an SP of the data storage system 12. Re-imaging may include retrieving a copy of an image from disk and copying the image from a disk to another location, such as to one of the SSDs. Re-imaging may be used, for example, to restore a copy of code to the SSD if a currently stored copy has been corrupted. Re-imaging may be used to obtain an initial copy of an image such as, for example, copying an image from disk to a newly installed device which may not have any images currently residing thereon.

SP B 120 includes a boot device 122 and SSD 124. Each of 122 and 124 may include copies of code stored thereon as described for SP A 110. In other words, SP B 120 may include its own copy of the same code as SP A 110. Both SP A and SP B may facilitate processing of I/O requests for data stored on devices 16a-16n. The data storage system 12 may use other hardware and/or software not illustrated in storing and retrieving data on the devices 16a-16n and in servicing I/O requests as well as data storage system management requests.

In the data storage system 12, one of the SPs (110 or 120) may be designated as the master or active SP, and the other SP may be designated as the slave or inactive SP. Whichever SP is designated as the active SP communicates with the management system 36 over connection 20. If there is a problem which causes the currently active SP to become unhealthy, a healthy inactive SP may assume the role of the active SP and handle all data storage system management communications.

In one embodiment, one of the SPs (110 or 120) may be initially designated as master based on configuration information so that each SP knows at boot up which SP is denoted as the master SP and which is denoted as the slave SP. In the event that the designated master SP is determined to be unhealthy as a result of the boot process, the other SP may assume the role of master. As a result of the boot process of booting SP A 110 and SP B 120, the following are possible outcomes with U denoting an unhealthy SP state and H denoting a healthy SP state:

|        | SP A | SP B |
|--------|------|------|
| Case 1 | U    | U    |
| Case 2 | U    | H    |
| Case 3 | H    | U    |
| Case 4 | H    | H    |

In connection with case 4, the SP specified as the master, such as in the configuration information or other predetermined information, assumes the master role. In connection with cases 2 and 3, whichever SP is denoted as H will be the designated master SP. In case 1, both SPs have instances of the AWS running as a result of the boot process and an embodiment may designate either one as the master. For example, in connection with case 1, the SP designated as master may be based on the configuration information, whichever SP was last designated as master, and the like. In case 1, an instance of the AWS will communicate with the web browser 104 in performing data storage system management requests. In connection with cases 1, 2, and 3 when there are one or more unhealthy SPs, the techniques herein may be used. If any of the SPs is unhealthy, processing on the data storage system 12 may provide for automatically determining the unhealthy state, communicating that information to the data storage management client software on the system 36, and automatically failing over from an unhealthy master SP to a healthy master SP (as needed and also provided that there is a healthy SP). The foregoing may be performed with communications between the data storage system management server (e.g., an instance of the WS or AWS) and client software over a single communication connection where any SP transitioning into the master role communicates with the data storage system management client software on the system 36. Processing in connection with an SP transitioning into the master SP role may be performed in automated fashion by code on the data storage system. Furthermore, in cases 2 and 3 denoted above where there is one healthy SP and one unhealthy SP, an embodiment may utilize the SP peer proxy code of the healthy SP to facilitate communications with the unhealthy SP over the single communication connection used for data storage system management transmissions. Thus, the client data storage system management software of 36 may issue requests to the unhealthy SP indirectly through the healthy SP using the single communication connection. The healthy SP may be characterized as accepting requests for itself or its unhealthy peer SP so that the healthy SP acts as a proxy between the client and the unhealthy SP. As such, a user may issue commands and other requests to the unhealthy SP such as to obtain information used to diagnose problems with the unhealthy SP and/or issue commands as corrective actions to the unhealthy SP over the single connection 20. Information regarding changes in SP state (e.g., transitioning to/from healthy and unhealthy states) may be communicated to the client software on the management system 36.

Figure 4:
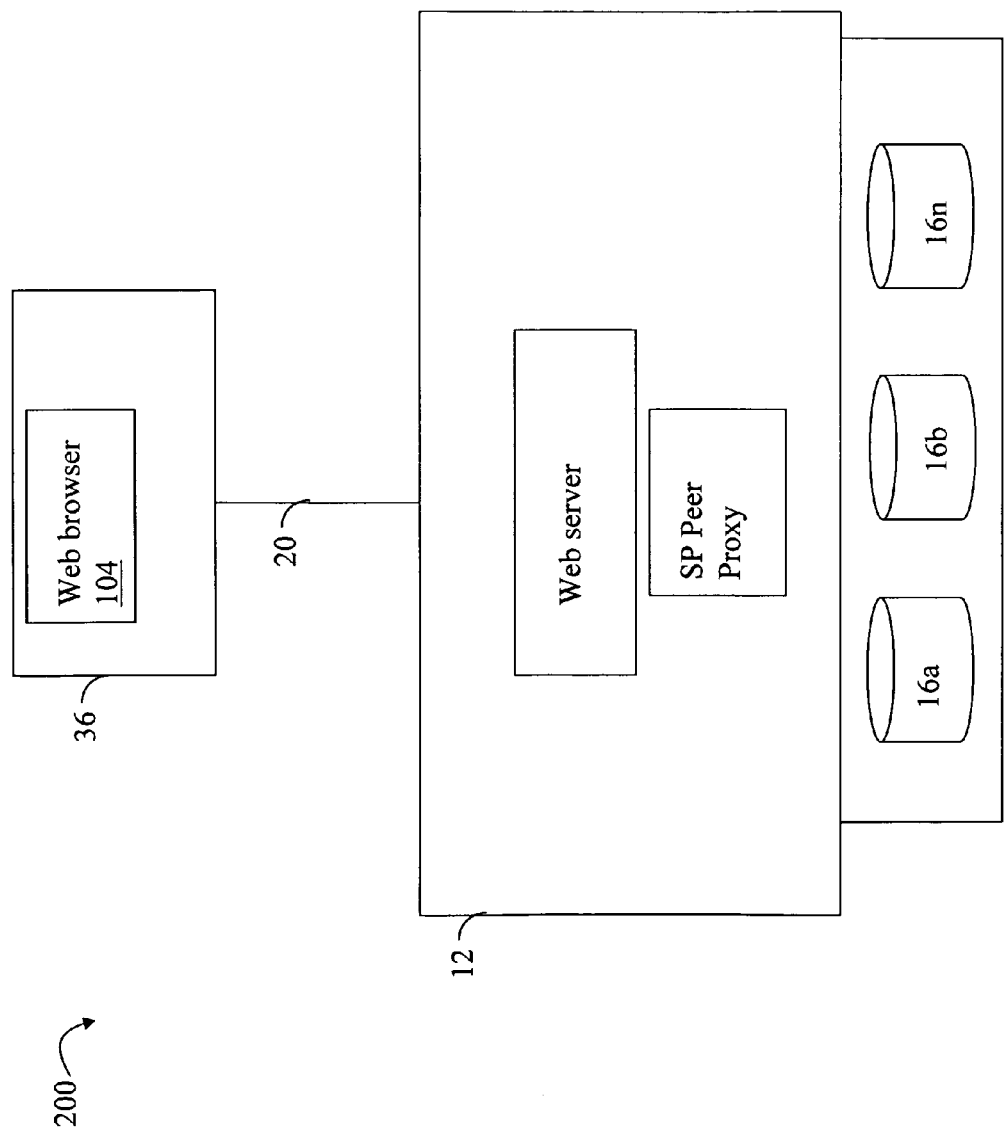
FIG. 4 is an example illustrating a logical view from the client side of communications with the data storage system when there is at least one healthy service processor (SP)

Referring to FIG. 4, shown is an example of a logical view from the client side of data storage system management communications in accordance with techniques herein when at least one SP is healthy such as, for example, denoted as cases 2, 3, and 4 above. The example 200 illustrates that, from the client perspective, a single WS in the data storage system communicates with the client software on the system 36. Also, as will be described in more detail in following paragraphs such as when there is one healthy master SP and one unhealthy slave SP, commands and other requests may be issued from the healthy SP (using the SP peer proxy code of the healthy SP) to the peer SP that is unhealthy.

Figure 5:
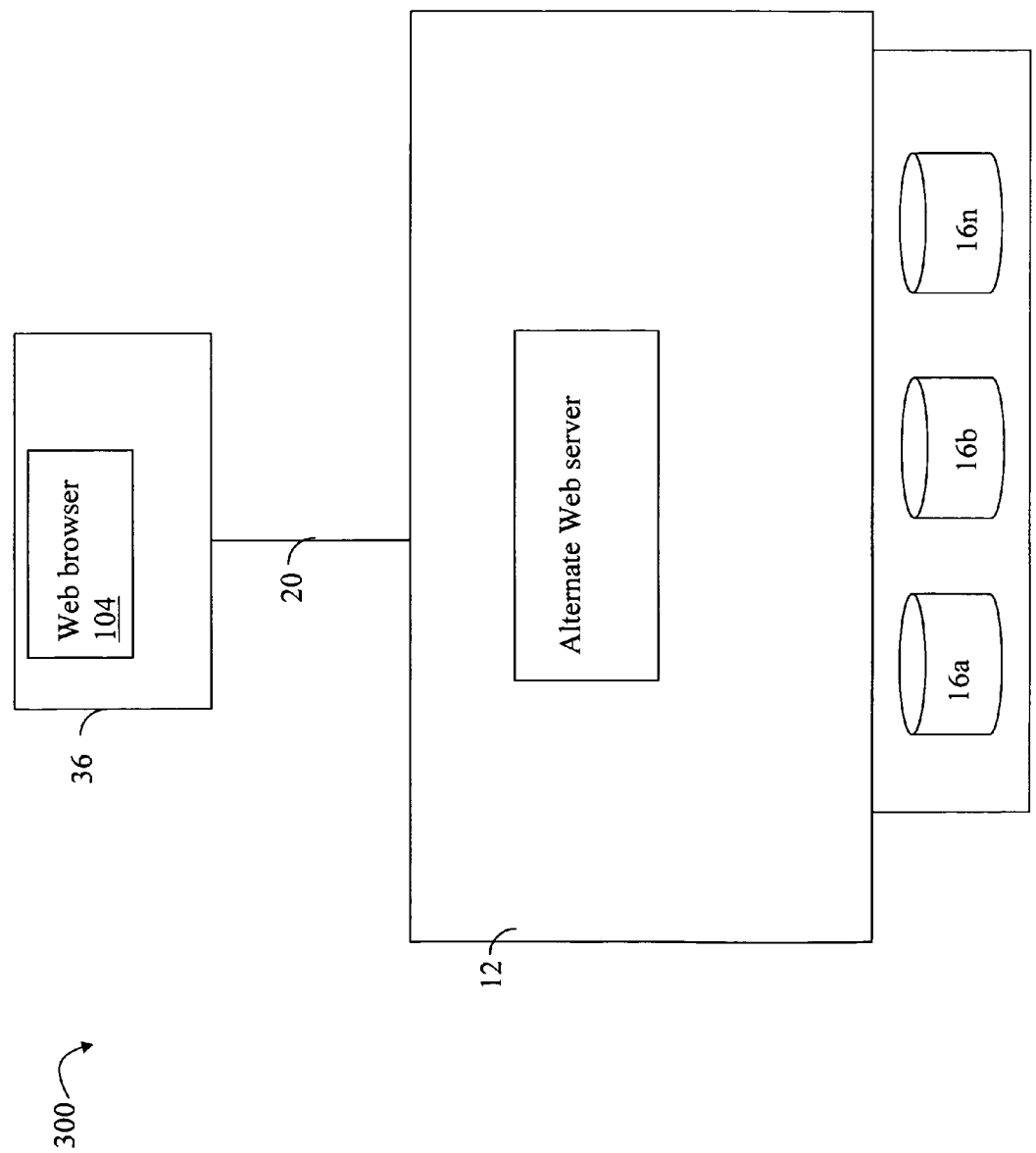
FIG. 5 is an example illustrating a logical view from the client side of communications with the data storage system when there are no healthy SPs.

Referring to FIG. 5, shown is an example of a logical view from the client side of data storage system management communications in accordance with techniques herein when both SPs are unhealthy such as, for example, denoted as case 1 above. The example 300 illustrates that, from the client perspective, a single AWS in the data storage system communicates with the client software on the system 36 in this case. Also, as will be described in more detail in following paragraphs, the AWS of the unhealthy master SP may be used to correct problems on the master SP to transition the master SP to a healthy state thus resulting in a scenario as illustrated and described above for cases 2 and 3. Subsequently, the now healthy master SP may be used to facilitate diagnosis and correction of problems of the peer SP using the SP peer proxy code of the healthy master SP.

Figure 6:
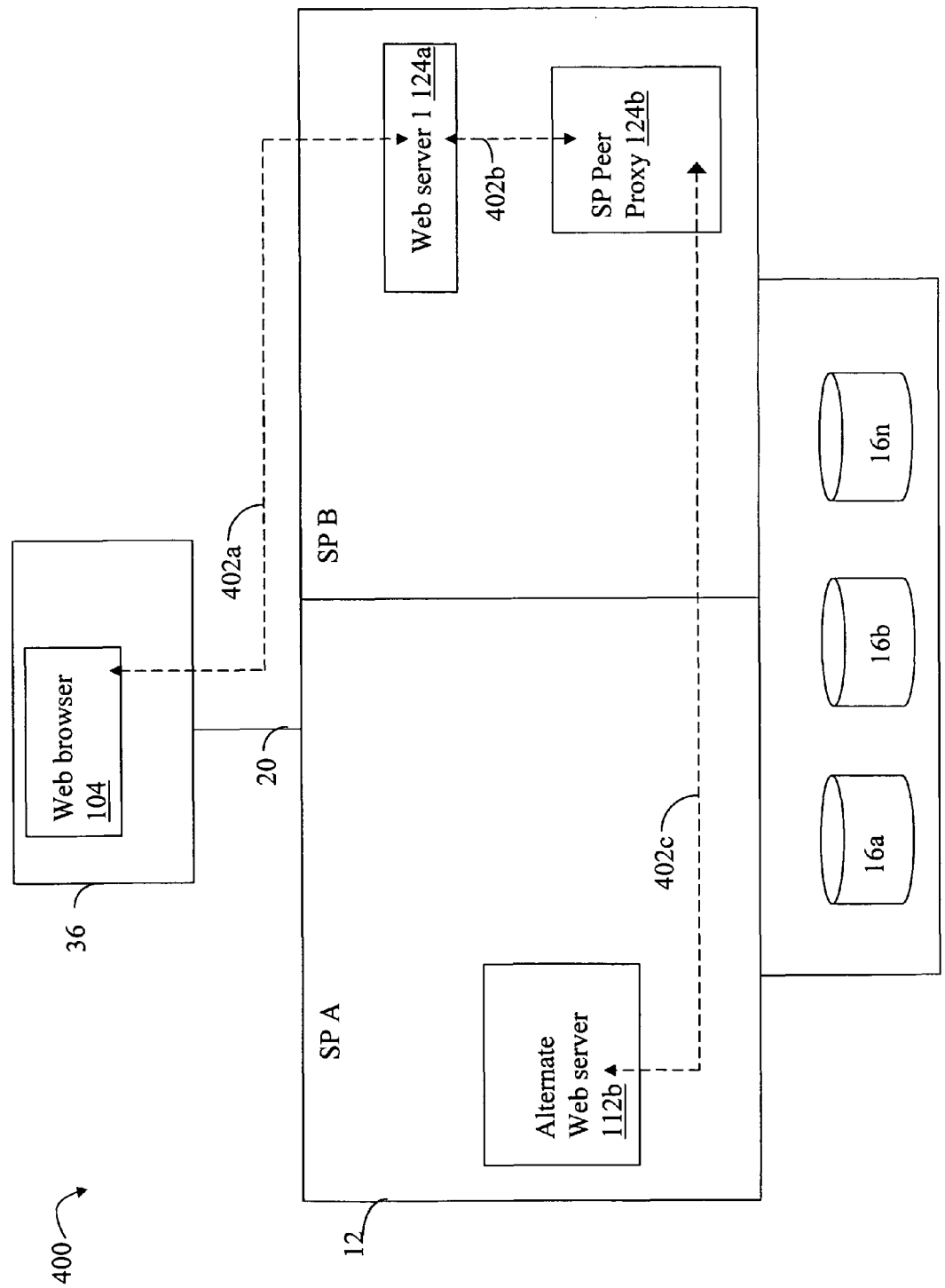
FIGS. 6, 7 and 8 are examples illustrating a communication path used in connection with communications between the management system and the data storage system in an embodiment using the techniques herein.

Referring to FIG. 6, shown is an example illustrating the communication path between the management system 36 including client software and components of the data storage system 12 in connection with the case where SP A is unhealthy and SP B is healthy. As described above, the boot code of SP A may determine that SP A is in an unhealthy state. As an example, the boot code may have been unable to successfully start up an instance of the WS and, alternatively, the AWS 112b is started and the state of SP A is determined as unhealthy. The boot code of SP B may determine that SP B is in a healthy state as a result of the boot process. For example, the boot code of SP B may perform processing including determining that an instance of the WS 124a was successfully loaded and started, and can communicate over connection 20 and internally with its peer SP A for data storage management transmissions. The SP peer proxy code 124b of SP B may be used to facilitate proxying communications between SP B and SP A. SP A may be designated as the master and SP B may be designated as the slave.

In the example 400, the external IP address associated with the communication connection 20 is associated with the designated master SP which in this case is SP B. SP A may use an internal network address which is internal with respect to the data storage system. Thus, SP A is not exposed via an external network address directly to other network components external to the data storage system. In other words, components external to the data storage system cannot directly communicate with SP A, the slave SP. The client software in the management system 36 communicates with the WS 124a to perform data storage system management operations as illustrated by 402a. The client software in the system 36 may also be notified regarding the unhealthy status of peer SP A. As such, one or more commands directed to SP A may then be issued from the system 36 to WS 124a. The commands may be communicated to SP A indirectly through SPB along the path illustrated by 402a, 402b and 402c. The command for SP A may be communicated to WS 124a (as denoted by 402a). WS 124a may then communicate the command to SP peer proxy code 124b (as denoted by 402b). SP peer proxy code 124b may then issue the command to the AWS 112b of the peer SP A (as denoted by 402c). As described herein, SP to SP communication may be performed, for example, using a bus or other means. As an example, a first command may request information regarding the status of SP A. Such information may be requested by the client software of 36 where a request is communicated along a request path to the components as illustrated by 402a, 402b and 402c. The first command may request, for example, log files including hardware and/or software errors, device status information, and the like, regarding SP A. Upon AWS 112b receiving the command in the form of a request transmitted along the path 402a, 402b and 402c, SP A may execute instructions to retrieve the requested information. The requested information included in the log files for SP A may be transmitted in the form of one or more responses from 112. The responses may be returned to the system 36 using the same path as the request but the path is traversed in the reverse direction. Thus, the response is sent from 112b to 124b to 124a to the system 36 and may be referred to as the response path. The same foregoing request and response paths may be used with issuing additional commands to SP A and transmitting any responses from SP A to the system 36. For example, the log information returned may be displayed to the user via a GUI on the system 36. The log information may provide information indicating a possible cause of the problem causing SP A's unhealthy state. Based on the log information displayed, the user of the system 36 may decide to take one or more corrective actions including issuing one or more subsequent commands to the AWS 112b of SP A via proxying through SP B as just described. To further illustrate, the log information may indicate that the SSD of the SP A including the code for the WS has hardware errors. As such, a corrective action may be to install a new SSD on SP A, issue a command to re-image the WS and other code from disk storage to the new SSD, and then reboot SP A. After the new SSD is installed on SP A, the foregoing series of commands may be issued as requests from the system 16 using client software communicating with the data storage system 12 using the request path 402a, 402b and 402c illustrated.

It should be noted that the foregoing example 400 is described for the case where SP B is the healthy master SP and SP A is the unhealthy slave SP. The techniques described in the example 400 may also be similarly performed for the case where SP A is the healthy master SP and SP B is the unhealthy slave SP.

An embodiment may use an inter-SP communication connection such as 806 of FIG. 2 to facilitate transmission of requests and responses between SPs when performing proxying as described in connection with FIG. 6 and others herein.

Figure 7:
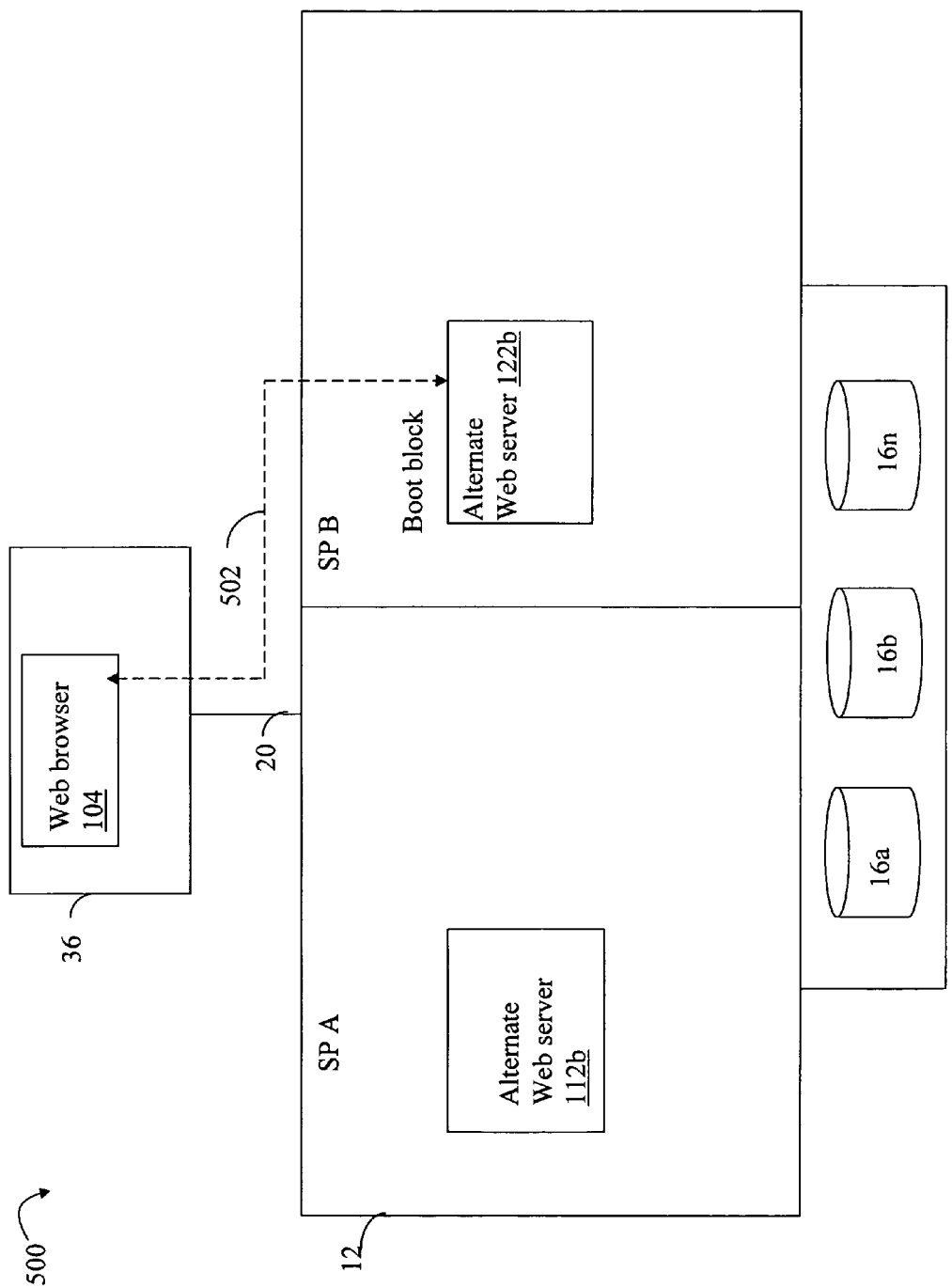

Referring to FIG. 7, shown is an example illustrating the communication path between the management system 36 including client software and components of the data storage system 12 in connection with the case where both SP A and SP B are unhealthy. As an example, the boot code of both SP A and SP B may be unable to successfully start up an instance of the WS and, alternatively, the AWS 112b is started on SP A, the AWS 122b is started on SP B, and both SP A and SP B are determined as unhealthy. In this example, SP B may be the master SP although SP A may alternatively be designated as the master SP. The example 500 illustrates code modules that may be active after booting the data storage system. In the scenario illustrated in 500, client software on the system 36 may communicate with the AWS 122b of the master SP. The user of the client software on the system 36 may issue commands to the AWS 122b similar to those commands described above when issued via proxy (e.g., indirectly) to AWS 112b. In the example 500, the commands may be issued as requests from the system 36 over connection 20 to AWS 122b (as illustrated by 502). Such commands may be used, for example, to collect information about SP B and/or take corrective actions with respect to SP B such as by rebooting, re-imaging and/or reinitializing as described elsewhere herein.

In one embodiment, the AWS 122b may be able to perform processing to execute the foregoing reduced set of commands on SP B and may not be able to otherwise facilitate communications with the peer SP A until SP B is in a healthy state with an instance of the WS executing on SP B. Once SP B has been placed in a healthy state, an instance of the WS executes thereon and the data storage system is in a state as described in connection with FIG. 6. As such, processing as described in connection with FIG. 6 may then be performed to place the other SP A in a healthy state by proxying commands to SP A (unhealthy SP) through SP B (healthy SP). As just described when there are 2 unhealthy SPs, an embodiment may require the master SP to be placed in a healthy state before communicating with the other SP. Thus, processing may be performed in an embodiment so that the SPs may be placed in a healthy state in a step-wise fashion, one at a time, via commands issued from the system 36 to the data storage system 12.

Figure 8:
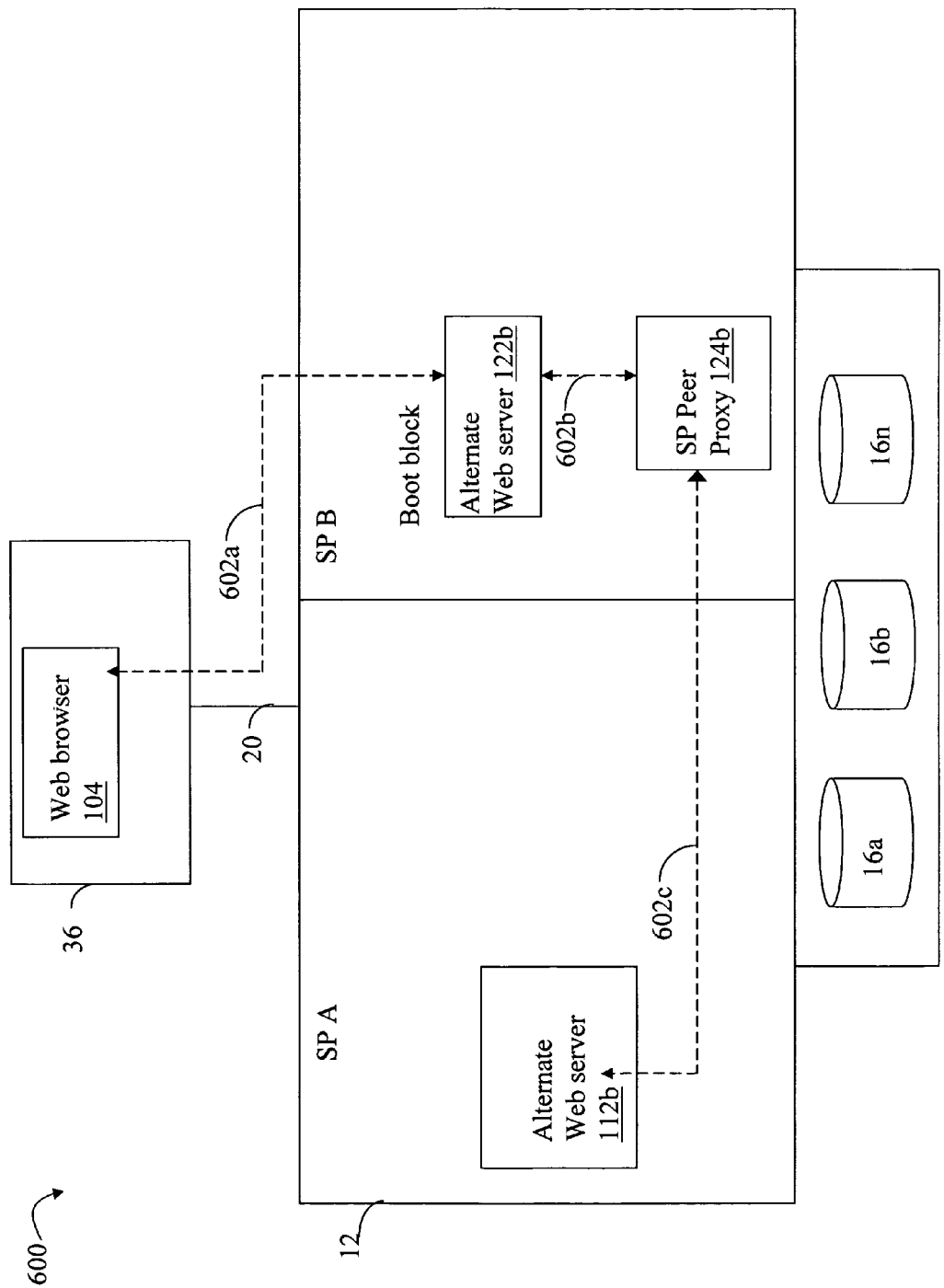

Referring to FIG. 8, shown is another example illustrating the communication path between the management system 36 including client software and components of the data storage system 12 in connection with the case where both SP A and SP B are unhealthy. In the example 600, SP B is the master and a user of the client software on the system 36 may issue a command to the AWS 122b as illustrated by 602a. In this example, the commands issued to 122b may be performed with respect to both SP A and SP B. In this example, the AWS 122b is able to perform processing to implement the reduced set of commands on SP B and also to instruct SP A to perform one or more of the reduced set of commands as well. For example, a user may issue a command to retrieve log information. The command may be issued to 122b which collects information for SP B. Additionally, AWS 122b communicates with SP peer proxy code 124b (as illustrated by 602b) to issue the same command to AWS 112b of SP A (as illustrated by 602c). As described above, for example, in connection with FIG. 2, the command from SP B to SP A may be communicated using the inter-SP communication connection as illustrated by 806 of FIG. 2. The path denoted by 602a, 602b, and 602c may form a request path by which both SP B and SP A are instructed to return log information. The log information may be returned along a response path which is the reverse of the request path as denoted by 602c, 602b, and 602c. In a similar manner, other commands to reboot, re-image and/or reinitialize may be performed with respect to both SPs with issuance of one or more commands received by AWS 122b. An embodiment may allow a user to issue a command from the system 36 to both SP A and SP B as described above where the same command may be applied to both SPs. Thus, a user may attempt to perform a same diagnostic or corrective action on both SPs at a same time. An embodiment may also allow a user to issue a command from the system 36 which is communicated to the AWS 122b and may be directed to only one of SP A or SP B rather than both. Thus, a user may attempt to try and place SP A in a healthy state using different commands than those issued to SP B. For example, suppose a first same command is issued to both SP A and SP B as described above to collect log information. The log information may indicate that SP A and SP B have different problems and may require different corrective actions. SP B may require a new device such as a new SSD. The new SSD may then need to be initialized with the images including WS and SP B may subsequently be rebooted. The problem with SP A may be easier to correct than SP B in that SP A does not need a new SSD. As such, a user may decide to issue commands which attempt to place SP A in a healthy state prior to taking corrective action regarding SP B. The user may issue commands to SP A (e.g., via proxy using SP B over request path 602a, 602b and 602c) to re-image the WS from disk to an SSD of SPA, and then reboot SP A. At this point, SP A may be placed in a healthy state and transition to become the master SP. Subsequently, commands may be issued to SP B via proxy using SP A as the master in a manner similar to that as described in connection with FIG. 6.

In connection with embodiments described herein, code executing on the data storage system may detect the transition of SP A from an unhealthy to a healthy state, automatically designate SP A as the new master SP, and perform processing to establish the WS on SP A as the end point of the communication connection with the management system 36. Processing performed by code executing on the data storage system when an SP transitions between the states of healthy and unhealthy is described in more detail elsewhere herein.

Figure 9:
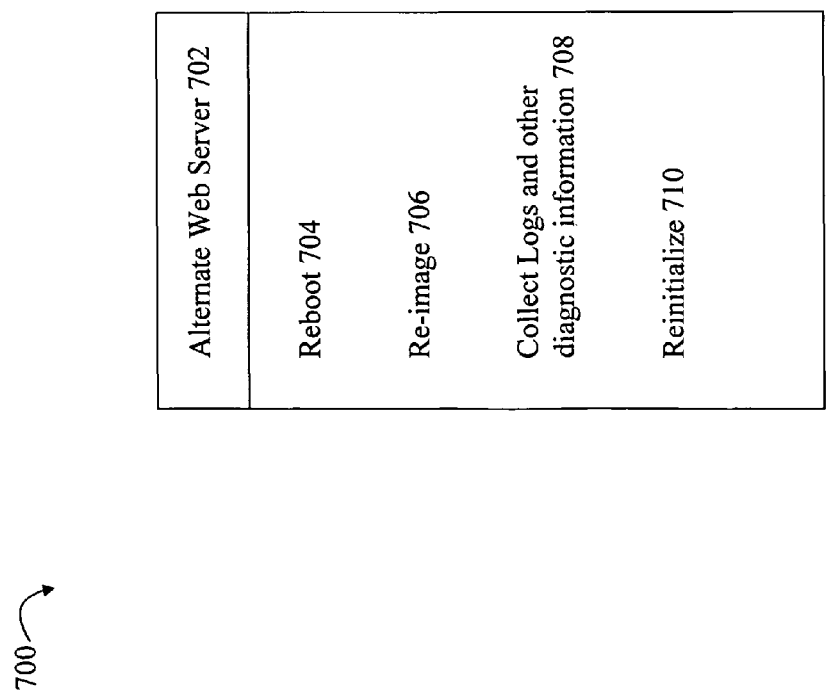
FIG. 9 is an example illustrating commands that may be performed by an embodiment of the alternate web server in accordance with the techniques herein.

Referring to FIG. 9, shown is an example illustrating the different operations that may be performed by the AWS 702 in an embodiment in accordance with techniques herein. The AWS 702 may perform processing for different commands with respect to the SP on which the AWS 702 resides. The commands may include reboot 704, re-image 706, collect logs and other diagnostic information 708 and re-initialize 710. Each of these commands is described in more detail elsewhere herein. The particular commands of the example 700 are illustrative and a embodiment may also include a different set of commands than as described herein. As also described above, an embodiment of the AWS 702 may also be used in proxying one of the foregoing commands to another AWS of the peer SP.

What will now be described are flowcharts of processing steps that may be performed in an embodiment using the techniques herein. The following flowcharts summarize processing steps described above. Processing of the following flowcharts and as described elsewhere herein may be performed by code executing on the data storage system.

Figure 10:
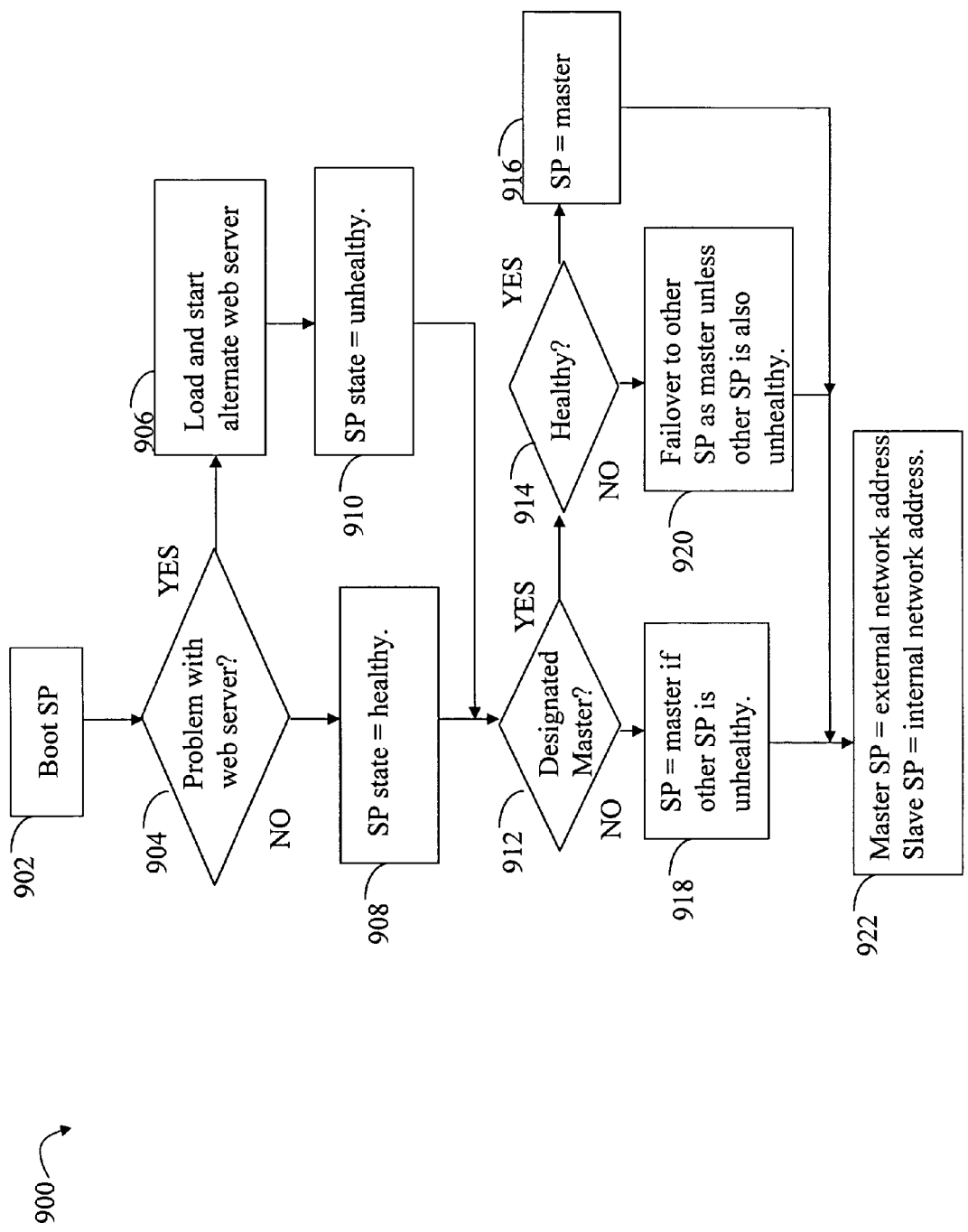
FIGS. 10, 11A, 11B, 12, and 13 are flowchart of processing steps that may be performed in an embodiment in connection with the techniques herein.

Referring to FIG. 10, shown is a flowchart of processing steps that may be performed in an embodiment performing the techniques herein in connection with an SP booting. At step 902, the SP performs boot processing. At step 904, such as may be performed at the end of boot processing, a determination is made as to whether there was a problem with booting the SP such that the SP does not meet one or more criteria associated with a healthy state. For example, an unhealthy SP state may be determined if the boot process was unable to load and start an instance of the WS as used in connection with performing server-side data management processing. If step 904 evaluates to yes, control proceeds to step 906 where the AWS is loaded and started on the SP and the SP state is determined to be unhealthy in step 910. If step 904 evaluates to no, such as when the WS is up and running and able to handle data storage management transmissions over the external management communication connection, the SP state is determined to be healthy. From steps 910 and 908, control proceeds to step 912 where a determination is made as to whether the SP is designated as the master. If step 912 evaluates to yes, control proceeds to step 914 where a determination is made as to whether the SP is healthy. If step 914 evaluates to yes, control proceeds to step 916 where the SP assumes the role of master SP and control proceeds to step 922. If step 914 evaluates to no, control proceeds to step 920 where there is a failover to the other SP as the master unless the other peer SP is also unhealthy. As a result of step 920, if the SP is unhealthy and the peer SP is healthy, the peer SP assumes the role as master SP. If both SPs are unhealthy and the SP is the designated master, the SP assumes the role of master. From step 920, control proceeds to step 922. If step 912 evaluates to no, control proceeds to step 918 where SP assumes the role of master if the other SP is unhealthy. Control proceeds from step 920 to step 922. In step 922, the master SP and slave SP are assigned addresses. Step 922 assigns the external network address, such as associated with the connection 20 of FIG. 1, to the master SP and an internal network address to the slave SP.

Figure 11A:
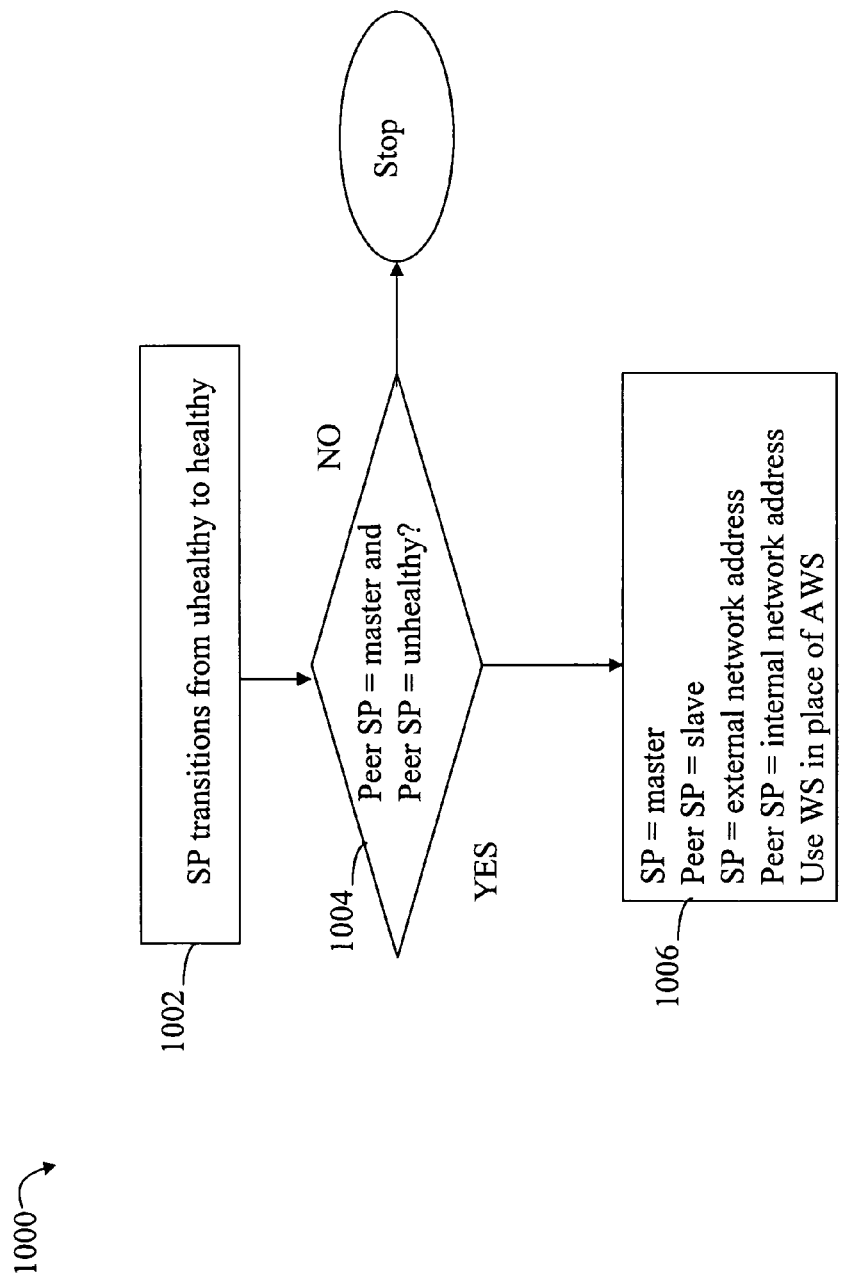

Referring to FIG. 11A, shown is a flowchart of processing steps that may be performed by an SP when the SP transitions from unhealthy to healthy. In step 1002, the SP transitions from unhealthy to healthy. In step 1004, a determination is made as to whether the peer SP is currently the master and whether the peer SP is also unhealthy. If not, processing stops. Otherwise if step 1004 evaluates to yes, control proceeds to step 1006 where SP assumes the role of master SP, the peer SP assumes the role of slave SP, SP is assigned the external network address of the communication path 20 (used to receive client communications), the peer SP is assigned an internal network address, and an instance of the WS is used in place of the AWS.

It should be noted that code for determining whether an SP is in a healthy or unhealthy state in accordance with one or more criteria may be performed by code included in the boot process. Additionally, the code for determining whether an SP is healthy or unhealthy may also be periodically executed by each SP after boot process has completed as part of normal or steady state processing. As such, although the techniques herein are described in connection with the boot process, the techniques herein may also more generally be used to assess and detect changes in SP status and perform processing with respect to data storage system management capabilities in an ongoing continuous basis.

Figure 11B:
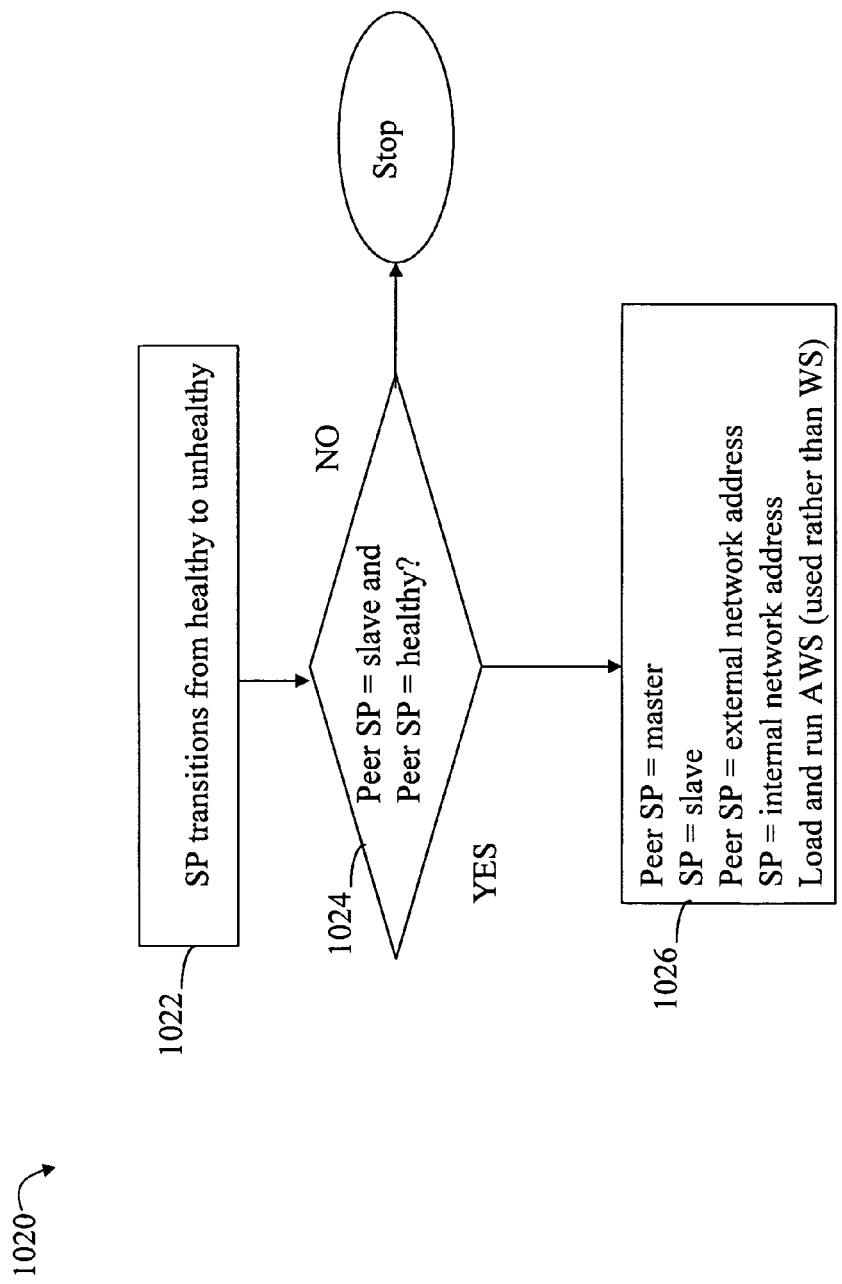

Referring to FIG. 11B, shown is a flowchart of processing steps that may be performed by an SP when the SP transitions from healthy to unhealthy. In step 1002, the SP transitions from healthy to unhealthy. In step 1020, a determination is made as to whether the peer SP is currently the slave SP and whether the peer SP is also healthy. If not, processing stops. Otherwise if step 1020 evaluates to yes, control proceeds to step 1026 where the peer SP assumes the role of master SP, the SP assumes the role of slave SP, the peer SP is assigned the external network address of the communication path 20 (used to receive client communications), the SP is assigned an internal network address, and an instance of the AWS is loaded and run for use in place of the WS.

Figure 12:
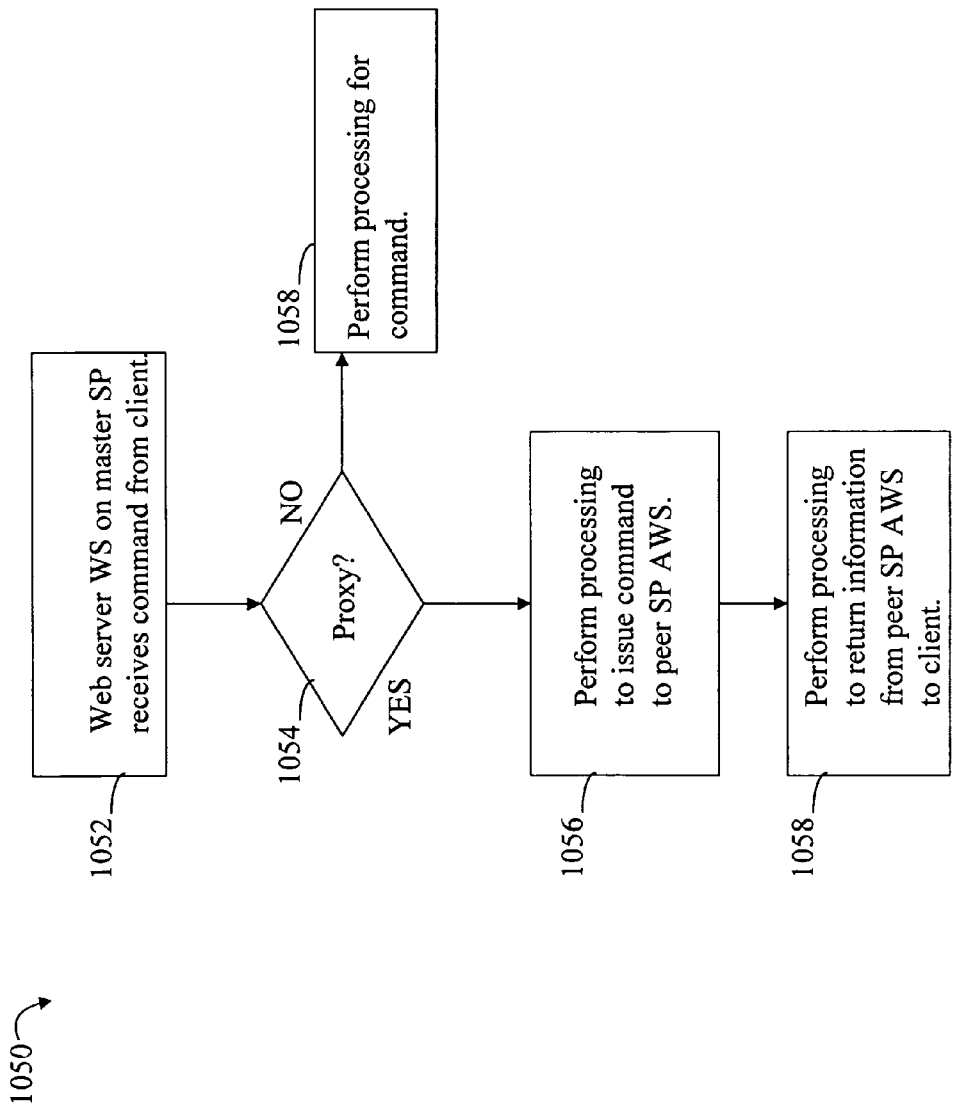

Referring to FIG. 12, shown is a flowchart of processing steps that may be performed by the web server (WS in previous examples) on a master SP in connection with the techniques herein. At step 1052, the WS receives a command from the client data storage system management software, such as from the management system 16. At step 1054, a determination is made as to whether the command is intended for the other peer SP and needs to be proxied to the other peer SP. If step 1054 evaluates to no, control proceeds to step 1058 where processing for the command is performed such as on the master SP. If step 1054 evaluates to yes, control proceeds to step 1056 where processing is performed to issue the command to the peer SP's AWS. Step 1056 may include executing code on the master SP which uses the inter-SP communication connection or other means to issue the command to the AWS on the peer SP. Step 1056 may include communicating the command, for example, over the connection 806 of FIG. 2. In step 1058, any return information from the peer SP is communicated to the client. As described above, the return information may be included in a response sent from the AWS of the peer SP to the client using the request path in a reverse direction.

Figure 13:
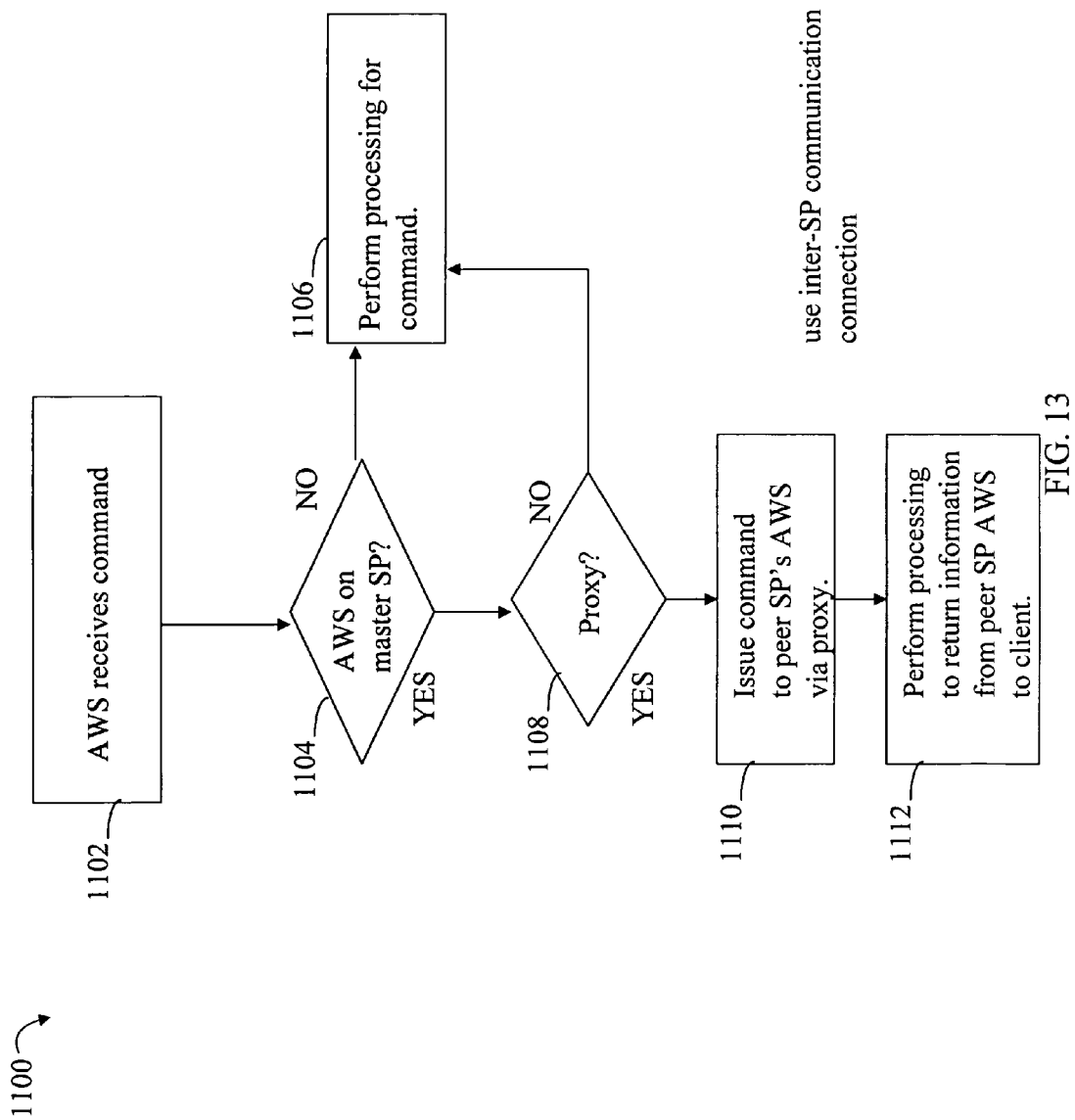

Referring to FIG. 13, shown is a flowchart of processing steps that may be performed by the AWS in connection with the techniques herein. It should be noted that the flowchart 1100 includes processing where the AWS may be used in connection with proxying commands to the peer SP. At step 1102, the AWS receives a command. At step 1104 a determination is made as to whether the AWS which received the command is on the master SP. If not, control proceeds to step 1106 where the command is processed by the AWS on the SP. If step 1104 evaluates to yes, control proceeds to step 1108 where a determination is made as to whether the command is a proxy command directed to the peer SP. If step 1108 evaluates to no, control proceeds to step 1106. If step 1108 evaluates to yes, control proceeds to step 1110 where processing is performed to issue the command to the peer SP's AWS. Step 1110 is similar to step 1056 of FIG. 12. From step 1110, control proceeds to step 1112 where processing is performed to return information, such as in the form of a response, to the client from the peer SP's AWS. Step 1112 is similar to step 1058 of FIG. 12.

Figure 14:
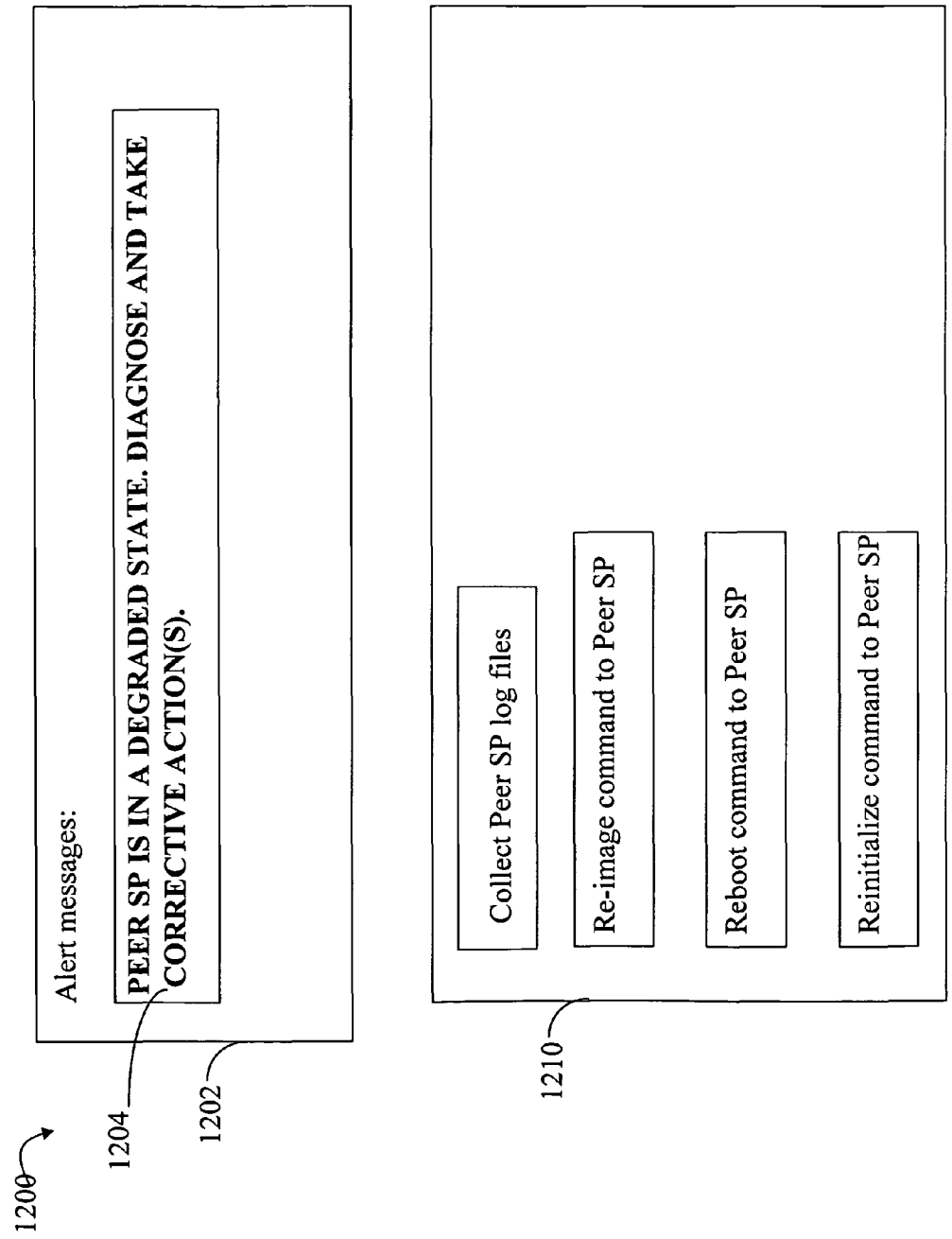
FIG. 14 is an example illustrating different screen shots that may be displayed on the management system in an embodiment utilizing the techniques herein.

Referring to FIG. 14, shown is an example of a screen shot that may be displayed via a GUI on the system 16. The example 1200 may be displayed, for example, when a user logs in at the management system 16. The user may have subscribed to receive notifications or alert messages displayed in area 1202 upon login. In this example, the message 1204 may be displayed as an icon or button which the user can select. The message of 1204 indicates that a peer SP is in a degraded state such as when the peer SP is in an unhealthy state and the user on the management system 16 may be communicating with a master SP which is healthy. In response to selecting 1204, the information in 1210 may be displayed, for example, in another web browser window. The element 1210 may include one or more buttons from which a user may select to issue subsequent commands to the peer SP. The displays of 1202 and 1210 may be used, for example, in connection with displaying information to a user on the management system 16 via a GUI when the data storage system includes one healthy master SP and one unhealthy slave SP. An embodiment may similarly use other displays as appropriate in connection with other data storage system SP states and commands.

In connection with techniques herein, there may be at most a single instance of the WS on each SP and a single communication connection used for performing data management operations where the single communication connection is between the client portion and the server portion of the data storage system management software. The single communication connection may be a network connection between the data storage system (including the data storage system management server software) and a system or device (including the data storage system management client software) used for communicating data management transmissions. In the example herein, the client software may be executing on a management system 16 and the server software may be executing on the data storage system 12. Using the internal network of the data storage system, such as the inter-SP communication connection 806 of FIG. 2, the techniques herein may be used to enable a user to manage an unhealthy SP by proxying commands through a healthy SP and associated WS over the single communication connection. Using the techniques herein, communications between a client and the data storage system over the single communication may be maintained so that if a current master SP becomes unhealthy, the client automatically communicates with a failover healthy SP should one exist in the data storage system. In the event that both SPs are in an unhealthy state, code on the data storage system may provide for the client interacting with an instance of the AWS.

In connection with performing the techniques herein in an ongoing continuous basis subsequent to booting the data storage system, an embodiment may load and start instances of various software modules as needed when an SP transitions from either the healthy or unhealthy state to the other as problems are encountered during operation of the data storage system over time, corrective actions are performed, and the like. For example, an SP may be in a healthy state after booting. Some time later on, the SP may experience problems which cause the SP to transition from the healthy to an unhealthy state. At this time, the SP may load and start an instance of the AWS. Although the examples illustrated herein show modules such as the AWS code being included in the boot device, AWS code and other code described herein may also be retrieved from other forms of computer readable media for use.

In embodiments using the techniques herein, information regarding the state of the data storage system may be communicated to the SPs. For example, the state information may include which SP is master. State information, as well as more generally other information that may be shared by multiple SPs of the data storage system, may be stored in a location (e.g., such as a location in memory or other form of computer readable media) which is accessible to all SPs. Accesses to the location may be synchronized using any of the different locking and other techniques known in the art. Shared information may also be communicated to the SPs using an internal data storage system communication network.

In connection with techniques herein, one or more criteria may be used in connection with determining whether an SP is in a healthy or unhealthy state with respect to data storage system management capabilities. As described herein, an SP may be characterized as being in the healthy state if the service processor has the ability to service normal data storage system management messaging traffic over a communication connection used for data storage management. The criteria used in making the foregoing assessment may include, for example, whether an instance of the WS is loaded and running, whether the WS can communicate over the external network connection used for data storage system management transmissions, whether the WS and/or other data storage system management server software can communicate with other peer SPs using the inter-SP communication means (such as element 806 of FIG. 2), whether code used for performing proxying to a peer SP is executing, or can be retrieved if needed, and the like. The particular criteria may vary with embodiment in accordance with the different aspects that may affect operation of the data storage system and data storage system management server software executing thereon.

What will now be described is processing that may be performed in an embodiment on the client side such as, for example, by code of the data storage system management client executing on the management system 36. It should be noted that in examples set forth herein regarding the client, a particular interface, such as a GUI, may be illustrated. However, it will be appreciated by those skilled in the art that the techniques herein may be used in connection with other types of user interfaces besides a GUI. The data storage system management client or client side code portion executing on the system 26 may include code of the GUI.

Described above is processing that may be performed by data storage system management server code executing on the data storage system. As described in following paragraphs, the GUI of the management system 16 may include code which performs processing in response to changes in the state of the data storage system being managed. The GUI, or more generally the data storage system management client, may perform processing which automatically makes adjustments on the client side in response to changes in the state of the data storage system.

The GUI may continuously and periodically poll the data storage system in order to detect changes in the data storage system state. The response to the polling request as received by the GUI may include information regarding the current data storage system state such as, for example, identify the web server which is currently servicing management request on the master SP and indicate whether each SP is healthy or unhealthy. It should also be noted that in following paragraphs set forth is an embodiment which uses polling to obtain information regarding the state of the data storage system. In addition to detecting changes in data storage system state using synchronous notification techniques such as polling, an embodiment may also use asynchronous even notification techniques alone, or in combination with synchronous techniques. For example, the data storage system may asynchronously notify the data storage system client code executing on the management system regarding changes in data storage system state. Such information may be communicated to and used by the GUI in connection with the techniques herein to determine when there are changes to the data storage system state and automatically take appropriate responses.

When the GUI determines that one or both SPs are unhealthy, the displayed user interface may be accordingly updated such as, for example, by disabling operations which cannot be performed until a particular problem is corrected, updating displayed alert and status information, presenting possible corrective actions as menu options with particular selections being visually distinguishable from other options as by highlighting or bolding, and the like. When both SPs are unhealthy, the GUI is communicating with one type of web server, the AWS, which may have different capabilities with respect to data storage system management requests than a second type of web server, the WS, which is executing on the data storage system when at least one of the SPs is healthy. Depending on which type of web server of the data storage system the GUI is communicating with, the GUI may make appropriate adjustments on the client side. When one or more SPs in the data storage system are in an unhealthy state, the GUI may also automatically take steps to retrieve log information or other status information about the data storage system SPs. Additionally, code on the management system and/or data storage system may analyze the log information or other status information and present the results of the analysis to the user via the GUI, for example, by updating the display, suggesting corrective actions, and the like. When one or more SPs transition from an unhealthy state to a healthy state, the GUI may also detect such changes and accordingly make updates.

Figure 15:
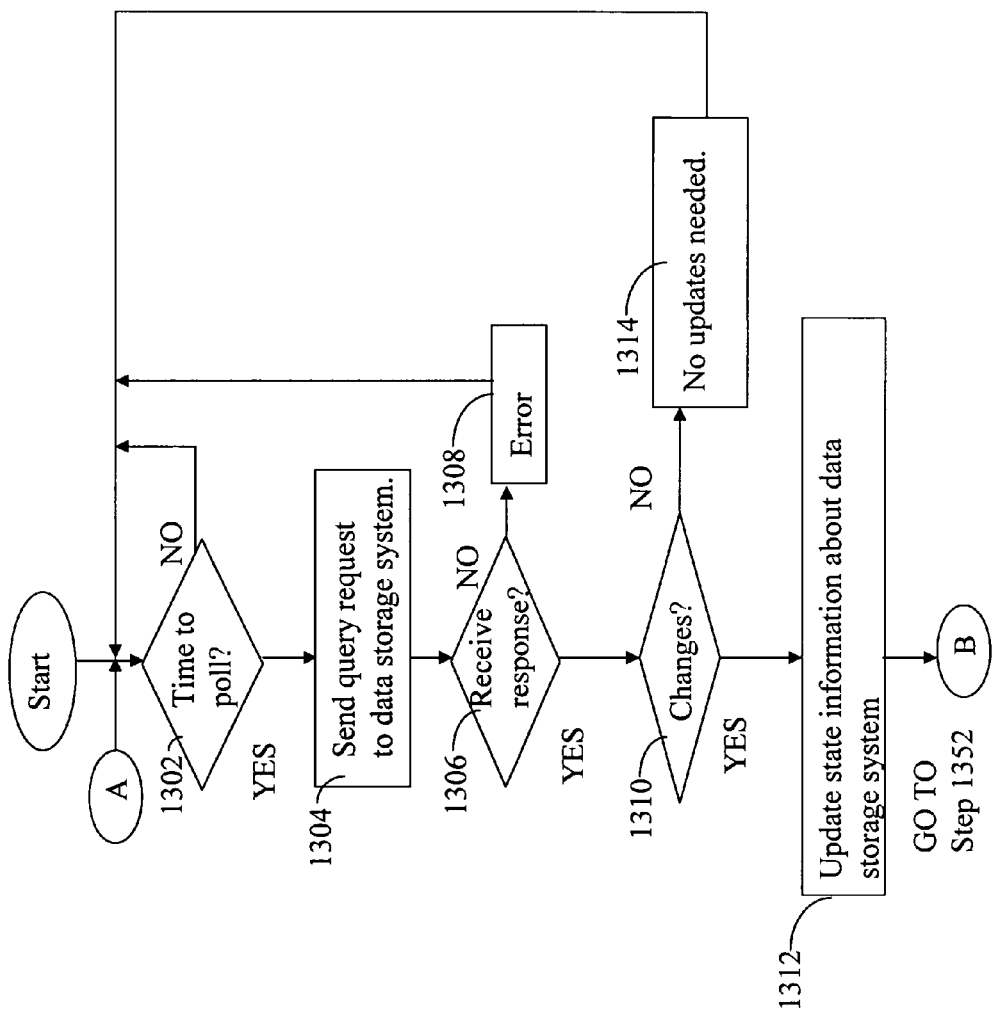
FIGS. 15, 16, 19 and 20 are flowcharts of processing steps that may be performed in an embodiment in accordance with techniques described herein.
Figure 16:
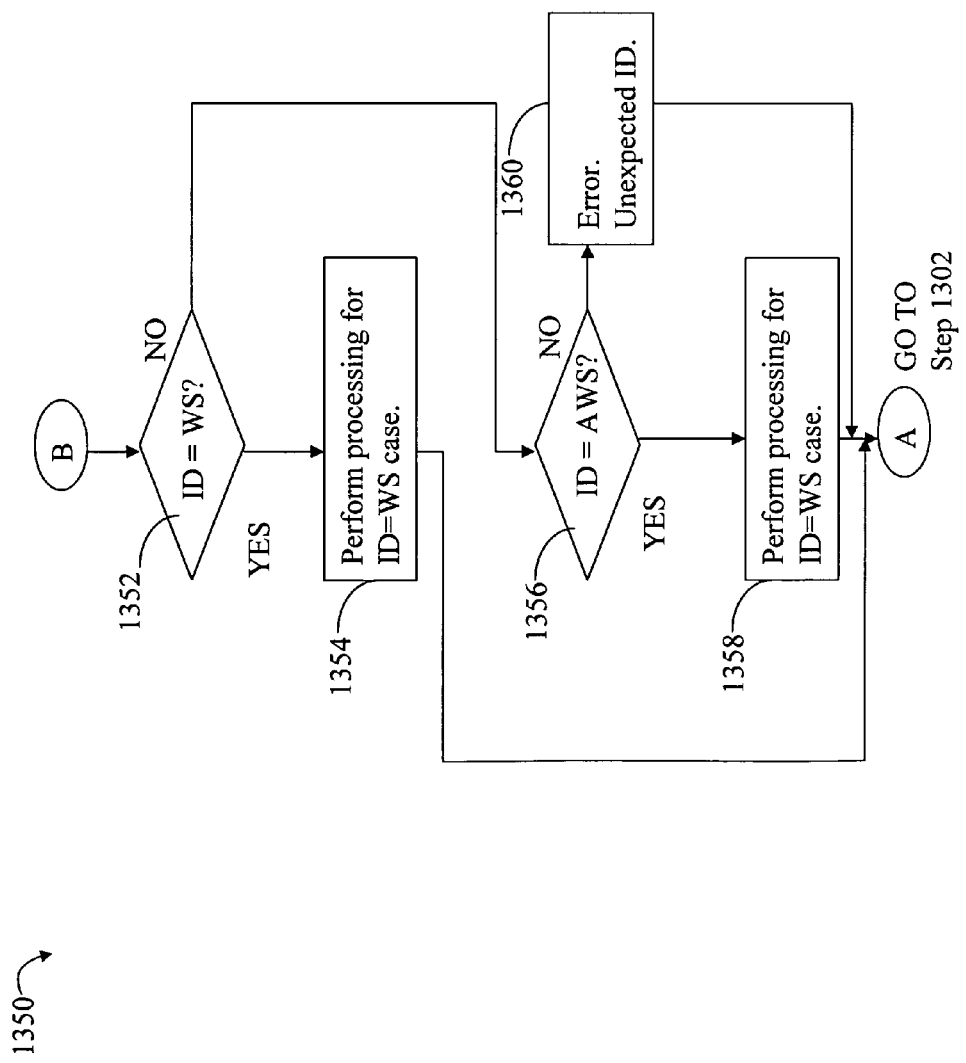

Referring to FIGS. 15 and 16, shown are flowcharts of processing steps that may be performed by data storage system management client code in an embodiment in accordance with techniques described herein. The steps of the flowcharts of FIGS. 15 and 16 may be performed by code of a GUI such as on the management system 36 of FIG. 1. At step 1302, a determination is made as to whether the next polling interval time has arrived. If not, processing waits at step 1302 until the next polling interval causing step 1302 to evaluate to yes. In one embodiment, the polling interval may be a number of seconds. When step 1302 evaluates to yes, control proceeds to step 1304 where a polling or query request is sent to the data storage system. At step 1306, a determination is made as to whether a response to the request sent in step 1304 was received. If not, control proceeds to step 1308 where error processing may be performed. Step 1306 may evaluate to no if a response is not received from the data storage system within a specified time out period, after a specified number of retries (e.g., unsuccessful attempts to resend the query and obtain a response), and the like, as may vary with embodiment. If no response is received, it may indicate a problem with communications between the data storage system 12 and the management system 36. From step 1308, control proceeds to step 1302 to wait for the next polling interval. It should be noted that, rather than proceed from step 1308 to 1302, an embodiment may also stop processing at step 1308 until additional actions are taken once such an error condition has occurred.

If step 1306 evaluates to yes, information included in the received response is examined. At step 1310, a determination is made as to whether there have been any changes in connection with data storage system state information since the last polling interval. In one embodiment, data storage system state information may include a health status indicator for each SP of the data storage system (e.g., U=unhealthy, H=healthy), and an identifier (ID) of the type of web server currently executing on the master SP which is receiving and processing data storage system management requests from the GUI. The foregoing information may be included in the response received each polling interval. A copy of the information may be stored, for example, in memory on the management system. At each polling interval, step 1310 may be performed by comparing the in memory copy (representing the state information from the previous polling interval) to the current state information (as included in the most recent response received). If no changes are determined by performing the foregoing comparison, step 1310 evaluates to no and control proceeds to step 1314 since no updates are needed to the GUI and state information. From step 1314, control proceeds to step 1302. If step 1310 evaluates to yes, control proceeds to step 1312 to update the in memory copy of the data storage system state information to include the information from the most current response.

Control proceeds to step 1352 where a determination is made as to whether the GUI is currently communicating with a first type of web server, such as an instance of WS, executing on a healthy SP. If step 1352 evaluates to yes, control proceeds to step 1354 to perform corresponding processing on the client side. From step 1354, control proceeds to step 1302. If step 1352 evaluates to no, control proceeds to step 1356 where a determination is made as to whether the GUI is currently communicating with a second type of web server, such as an instance of the AWS, executing on an unhealthy SP. If step 1356 evaluates to no, control proceeds to step 1360 for error processing in connection with an unexpected server type. From step 1360, control proceeds to step 1302. It should be noted that, rather than proceed from step 1360 to step 1302, an embodiment may also terminate processing when an error condition of step 1360 is determined. If step 1356 evaluates to yes, control proceeds to step 1358 to perform corresponding processing on the client side. From step 1358, control proceeds to step 1302.

It should be noted that the techniques described herein are illustrated with respect to a data storage system having 2 SPs with two types of web servers (denoted WS and AWS). An embodiment using the techniques herein may also have more than 2 SPs and/or more than two possible types of web servers.

In one embodiment, the different types of web servers of the data storage system may utilize different protocols. Thus, depending on which type of web server the GUI is communicating with, the GUI may have to use the appropriate protocol for client-server communications. For example, in the embodiment described herein, WS (which executes on a healthy SP and can handle normal data storage system management traffic) may be able to send and receive transmissions in accordance with BAM (Business Activity Monitoring) and CGI (Common Gateway Interface). AWS (which executes on an unhealthy SP and can handle only a reduced set of data storage system management operations) may be able to send and receive transmissions only using CGI. As known in the art, BAM is an XML-based messaging protocol, and CGI is a standard protocol for interfacing an application with a server, such as a web server. As a result, the GUI may accordingly alter the communications sent to the data storage system depending on which type of web server is currently receiving management requests on the data storage system and the protocol(s) understood by this web server type. It should be noted that the polling request sent in step 1304 of FIG. 15 may be in accordance with a protocol which is understood by either type of web server. In one embodiment, the polling request may be an HTTP request and the response may be a simple XML response. In an embodiment, the GUI may also track as part of data storage system state information which communication protocol(s) are understood by the current web server type. A table or other structure may encode a mapping of web server type and associated communication protocol(s) and may be used by the GUI to determine which protocol(s) to use.

Figure 17:
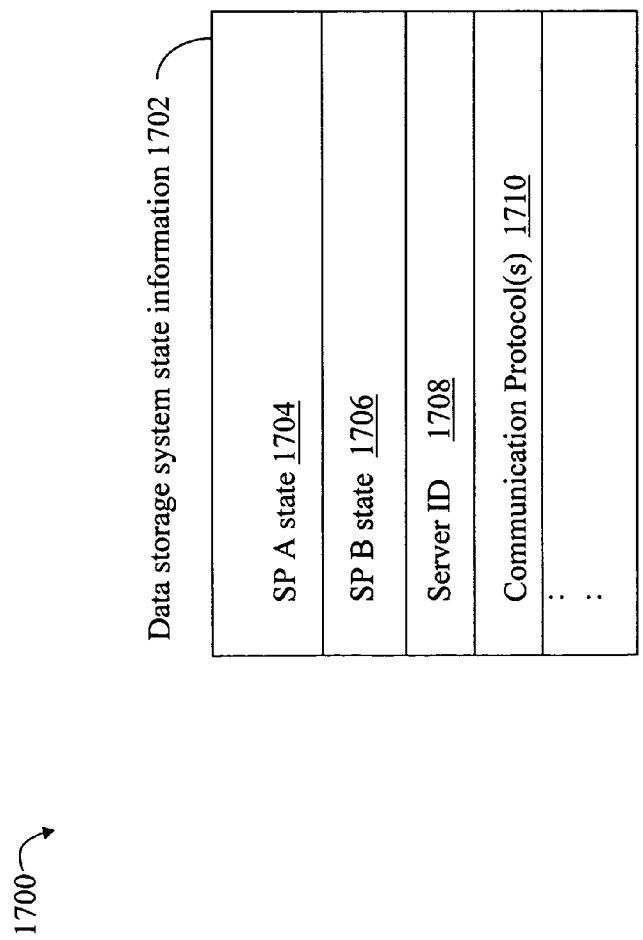
FIG. 17 is an example representation of data storage system state information in an embodiment in accordance with techniques herein.

Referring to FIG. 17, shown is an example representation of data storage system state information 1702 that may be used in an embodiment in accordance with techniques herein. The information 1702 represents information that may be used in an embodiment as described herein where the data storage system includes two SPs—SP A and SP B. The information 1702 may include SP A state 1704, SP B state 1706, server ID 1708, and identify one or more communication protocols 1710. The elements 1704 and 1706 may be indicators characterizing, respectively, the state of SP A and SP B as healthy or unhealthy. The server ID 1708 may indicate the type of web server on the data storage system currently handling data storage system management requests from the GUI. The server ID 1708 may indicate whether the web server on the master SP is an instance of WS or AWS. Element 1710 may indicate the one or more communication protocols understood by the type of web server identified by the server ID 1708. Each response received to a polling request sent in step 1304 of FIG. 15 may include an instance of 1704, 1706 and 1708 describing the current state of the data storage system at the time of polling. In one embodiment, the communication protocol 1710 may be determined using a table based on a value for server ID 1708.

Figure 18:
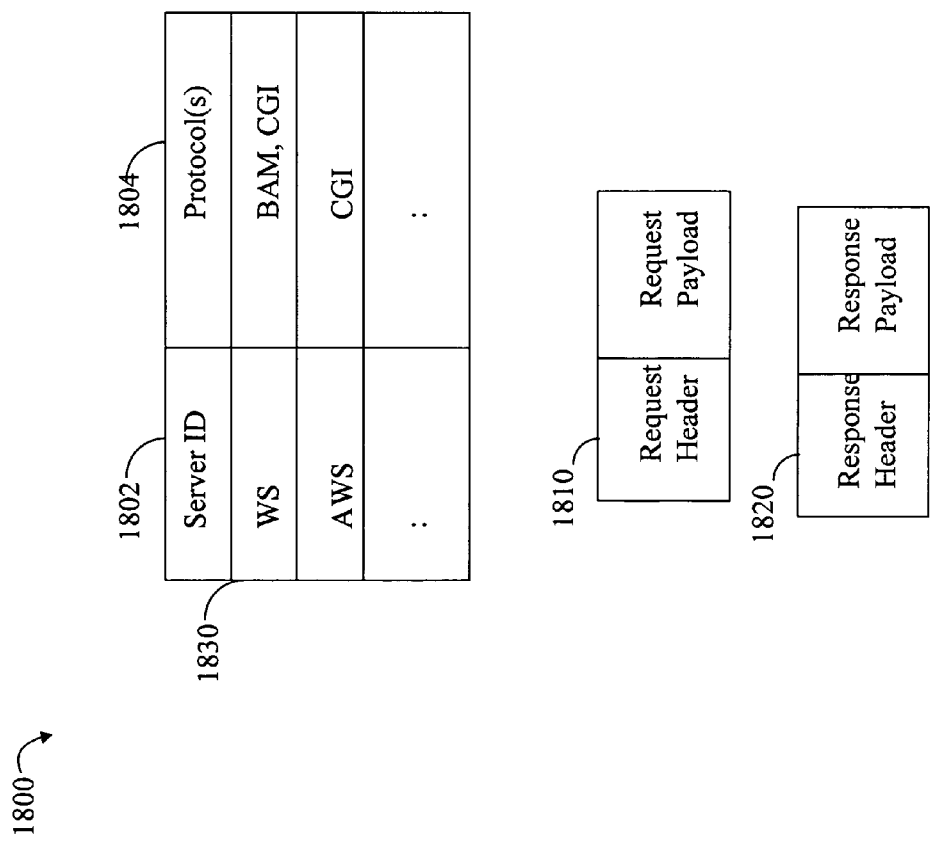
FIG. 18 is an example representation of a table used to determine web server communication protocols and a format of requests and response that may be used in an embodiment in accordance with techniques herein.

Referring to FIG. 18, shown are example representations of a table 1830 used to determine the communication protocols for a web server type, and request 1810 and response 1820 messages that may be used in an embodiment in accordance with techniques herein. The table 1830 includes a column 1802 of server IDs and a column 1804 of one or more communication protocols. Each row of 1830 identifies the protocols corresponding to a particular type of web server indicated by server ID. It should be noted that the information of the table 1830 may also take various other forms, such as rules, hard coded in logic of GUI code, and the like. Element 1810 represents a general format or layout of a request which may include a request header and a request payload or data portion. Element 1820 represents a general format or layout of a response which may include a response header and a response payload or data portion. The various requests and responses sent as transmissions between the management system 16 and data storage system 12 in connection with techniques herein may be as illustrated in the example 1800.

The communication protocols described herein for purposes of illustration are examples and an embodiment may use other protocols than as described herein for data storage system management transmissions. For example, transmissions may be text or other human readable forms and may have any one of a variety of different formats. Transmissions may be in forms which are not human readable. Transmissions may be encrypted, in a binary form (such as when used with remote procedure calls (RPCs)) and the like. Transmissions may generally be in any form so long as the GUI is capable of understanding the different possible protocols of the different types of web servers.

As previously mentioned, an embodiment may also use asynchronous notification techniques to provide the client software on the management system with notification regarding changes to data storage system state information. With reference back to FIG. 15, an embodiment may use asynchronous event notification techniques rather than the synchronous polling technique described. In such an embodiment, steps 1302, 1304, 1306 and 1308 of FIG. 15 may be replaced with steps which receive control upon the occurrence of an asynchronous event notification. For example, a module or routine included in the client code may be registered with the server code on the data storage system to receive notification of particular events related to changes in data storage system state. Upon the occurrence of one of the registered events, the data storage system sends a notification (including information about the event) to the registered module or routine of the client code. Subsequent to receiving the asynchronous event notification and extracting the data storage system state information communicated by the notification, processing may continue with step 1310 of FIG. 15.

An embodiment may also use asynchronous event notification in combination with the synchronous polling technique, for example, where the polling technique is used to retrieve a first portion of the data storage system state information and a second different portion of the data storage system state information is obtained using the asynchronous event notification. For example with reference to FIG. 17, polling may be used to obtain the current web server type as indicated by server ID 1708 and asynchronous event notification may be used to notify the client when there are changes in SP states as indicated by 1704 and 1706. Changes in the server ID provide some indication regarding changes in SP state and data storage system state. However, an embodiment may not be able to determine and distinguish between all possible state changes that can occur in order to perform appropriate processing without additional information besides changes in the server ID.

Figure 19:
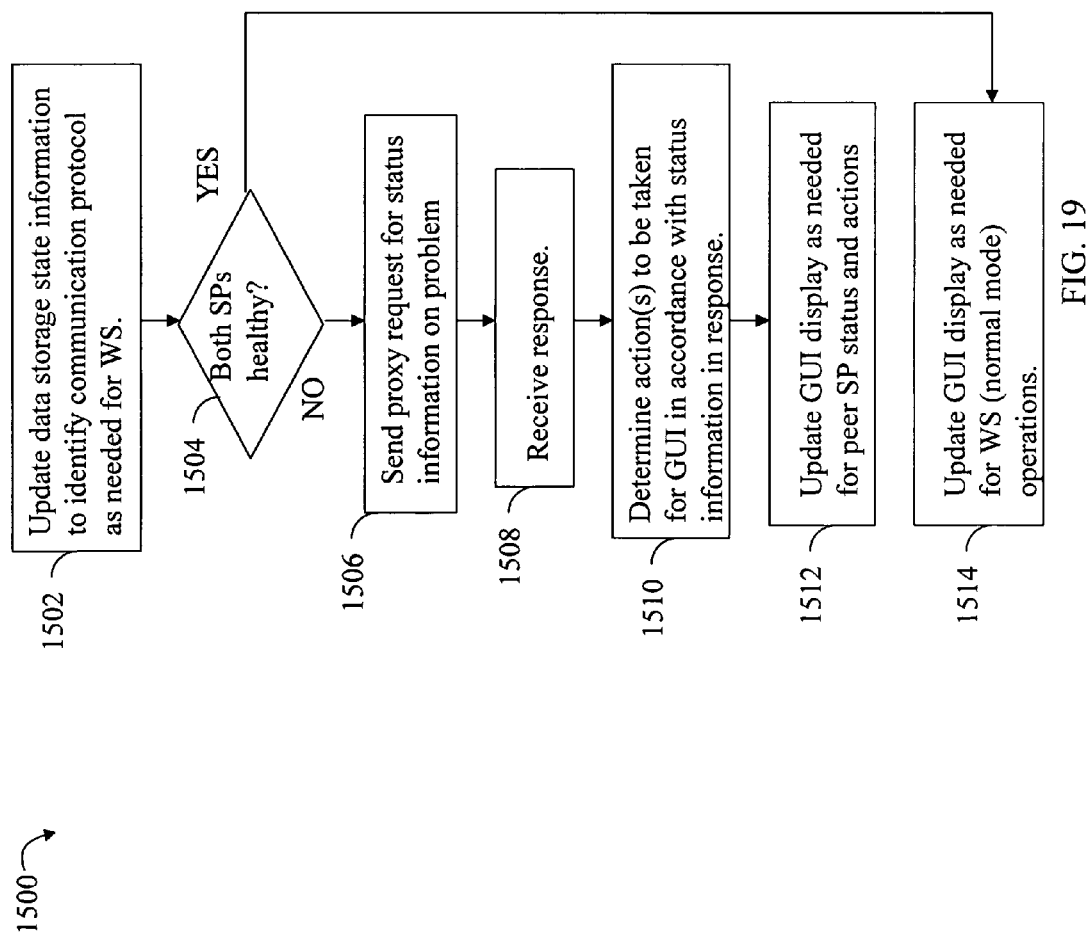

Referring to FIG. 19, shown is a flowchart of more detailed processing of step 1354 of FIG. 16 that may be performed in an embodiment when the GUI is communicating with a healthy SP. The steps of the flowchart 1500 may be performed by code of the GUI when the web server currently executing on the master or active SP of the data storage system is an instance of WS, the type of web server capable of processing normal or typical data storage system management traffic. At step 1502, the data storage system state information may be updated to identify the communication protocol(s) for communicating with an instance of WS. Step 1502 may include updating the copy of state information maintained on the client and may be determined using the table 1830 of FIG. 18 based on the server ID=WS. When the GUI is communicating with an instance of WS, at least one of the SPs of the data storage system is healthy. Thus, in an embodiment as described herein with 2 SPs, the SPs of the data storage system SP states may correspond to one of three cases described above—both SPs are healthy, SP A is healthy and SP B is unhealthy, or SP A is unhealthy and SP B is healthy. Processing of the flowchart 1500 describes client-side processing for these three cases.

At step 1504, a determination is made as to whether both SPs are healthy. If not, only one of the SPs is unhealthy and control proceeds to step 1506 where a proxy request may be sent for status information, such as for log information, to the unhealthy SP. Step 1506 may be characterized as a request for information about the problem on the unhealthy SP. As described elsewhere herein in one embodiment when one of the SPs is unhealthy and the other SP is healthy, requests can be proxied to the unhealthy SP through the healthy SP. At step 1508, a response may be received including the requested status information. At step 1510, processing is performed to determine the action to be taken by the GUI in accordance with the status information in the response. Step 1510 may include looking up information in a table to determine the action(s) to be taken in response to particular status information. Step 1510 is described in more detail elsewhere herein.

At step 1512, the GUI display is updated as needed to indicate, for example, the current status of each SP, disabled operations (e.g., by graying out menu items), displaying menus and menu items for possible additional corrective actions, and the like. Step 1512 is described in more detail elsewhere herein.

If step 1504 evaluates to yes indicating that both SPs are healthy, control proceeds to step 1514 where the GUI display is updated as needed to indicate normal operation mode. Step 1514 may include, for example, updating the display to indicate that all types of management operations are valid, removing any displayed menu or menu items not associated with a state where both SPs are healthy, and the like.

Figure 20:
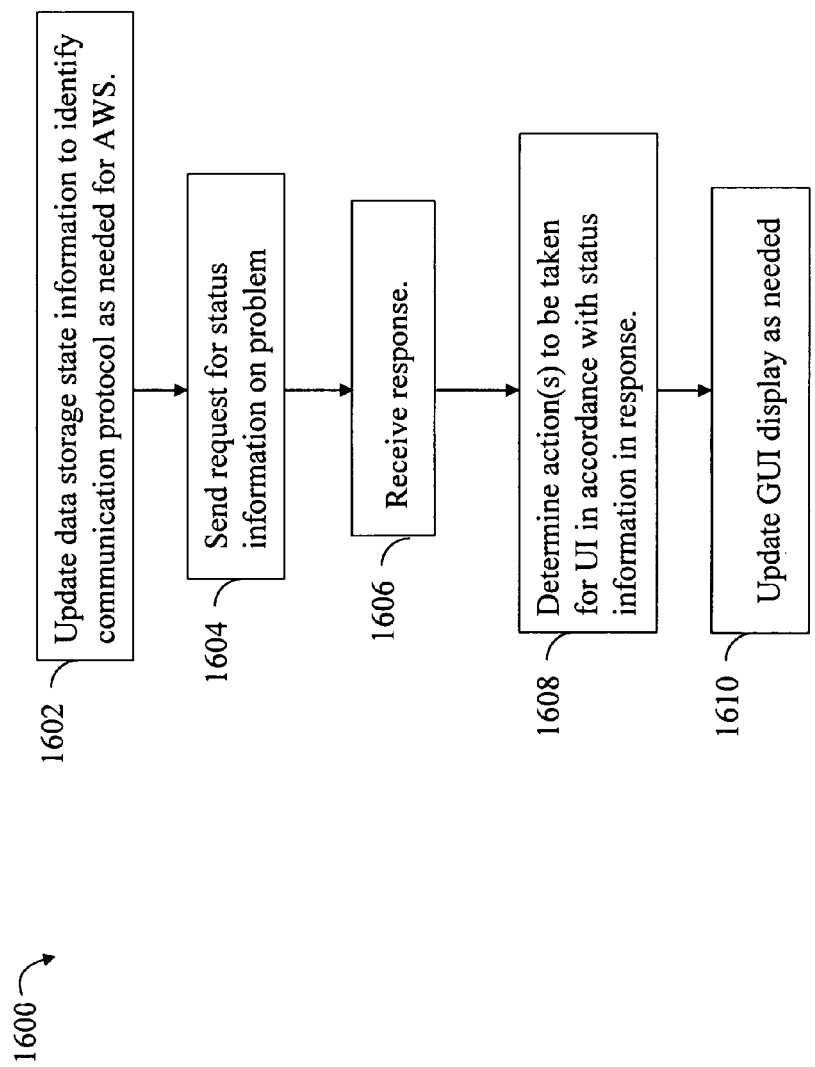

Referring to FIG. 20, shown is a flowchart of more detailed processing of step 1358 of FIG. 16 that may be performed in an embodiment when the GUI is communicating with an unhealthy SP. The steps of the flowchart 1600 may be performed by code of the GUI when the web server currently executing on the master or active SP of the data storage system is an instance of AWS, the type of web server capable of processing only a reduced set or portion of the normal or typical data storage system management traffic. In an embodiment as described herein with 2 SPs, the steps of flowchart 1600 describe client-side processing performed when both the SPs of the data storage system are in an unhealthy state. The steps of flowchart 1600 illustrate processing in an embodiment (e.g., such as described in connection with FIG. 7) where the master SP needs to be in a healthy state with an instance of WS executing prior to proxying commands to the unhealthy peer SP. Such an embodiment may provide support proxying commands between SPs using functionality included in WS or other code (such as a plug-in) used with WS.

At step 1602, the data storage system state information may be updated to identify the communication protocol(s) for communicating with an instance of AWS. Step 1602 may include updating the copy of state information maintained on the client and may be determined using the table 1830 of FIG. 18 based on the server ID=AWS. When the GUI is communicating with an instance of AWS, both SPs are unhealthy. At step 1604, a request is sent to the data storage system for status information regarding the master SP. The request is received and processed by the AWS instance of the master SP which collects the requested information about the master SP, and then sends a response which is received by the client in step 1606. At step 1608, one or more actions to be taken for the GUI are determined in accordance with the status information of the response. Step 1608 is similar to step 1510 of FIG. 19. At step 1610, the GUI display is updated as needed. Step 1610 may include, for example, updating the GUI display to indicate the status of both unhealthy SPs, disabled operations, menus and menu items as appropriate for the unhealthy state of the SPs, and the like. Steps 1608 and 1610 are described in more detail elsewhere herein.

It should be noted that although the steps of FIG. 20 are described with reference to one particular embodiment where both SPs are disabled as illustrated in FIG. 7, the GUI may similarly perform processing and take appropriate actions in an embodiment where a same command may be issued to both unhealthy SPs and/or where an embodiment may support proxying commands between unhealthy SPs as also described herein (e.g., see FIG. 8).

Figure 21:
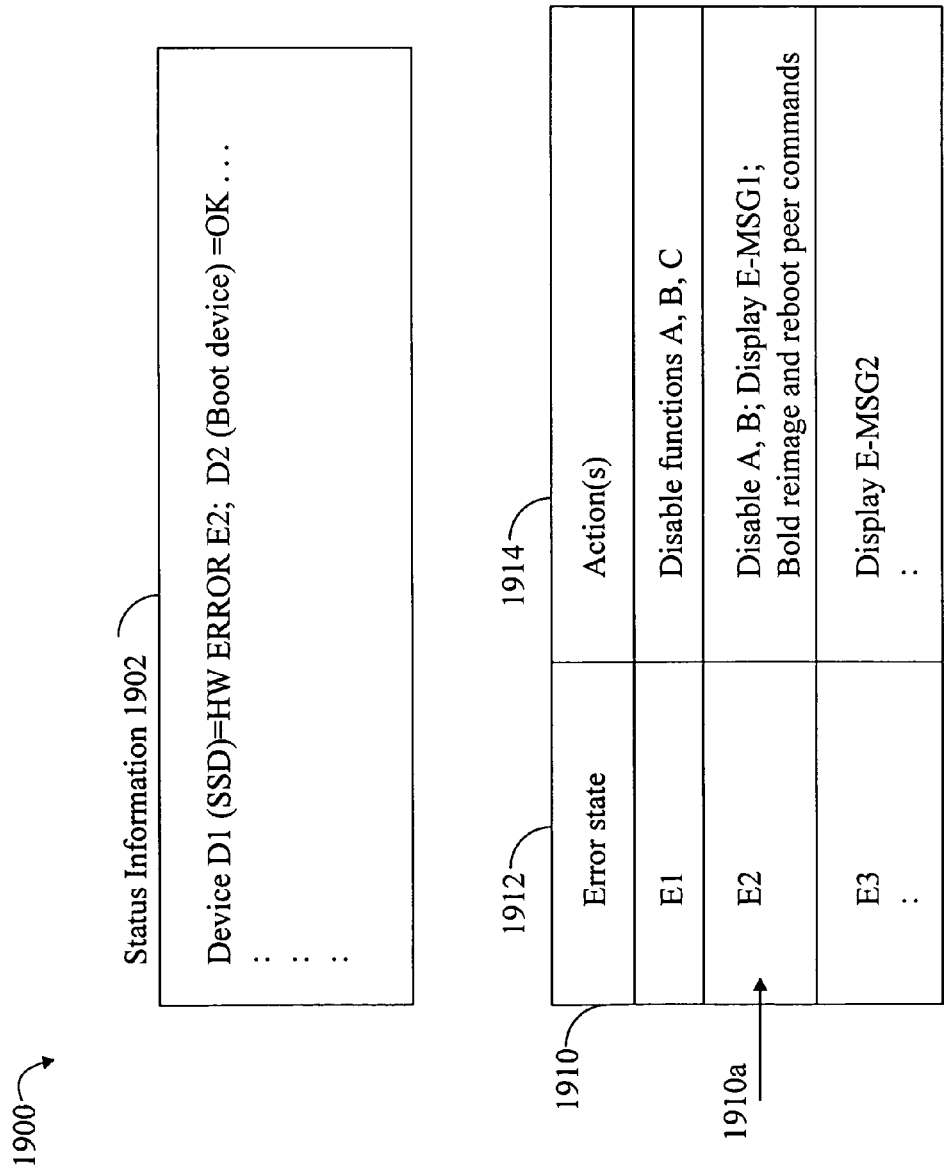
FIG. 21 is an example of status information and a table of actions that may be used in an embodiment in accordance with techniques herein.
Figure 22:
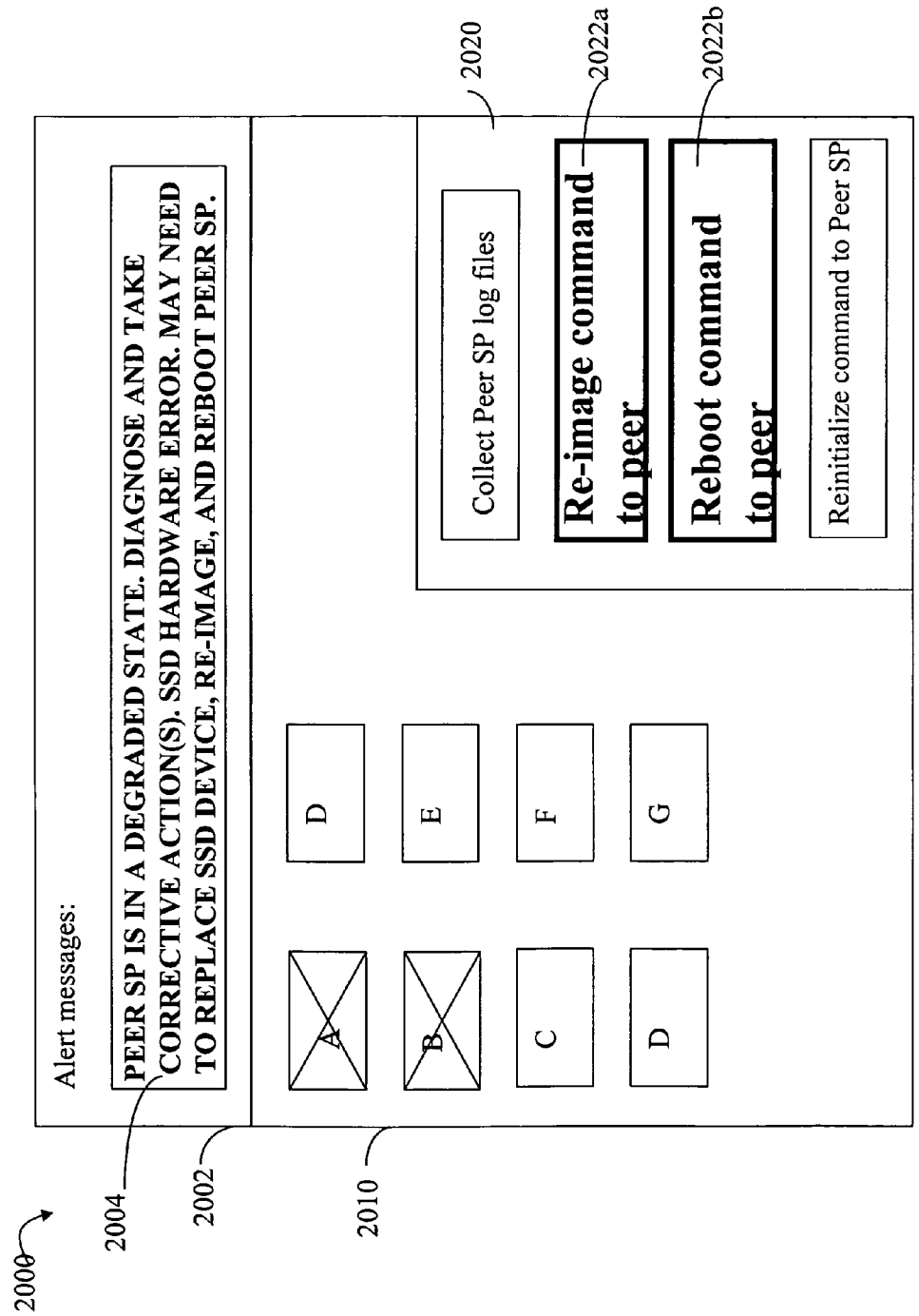
FIGS. 22-23 are examples of user interfaces that may be displayed in an embodiment in accordance with techniques herein.

Referring to FIG. 21, shown is an example 1900 of status information 1902 and a table 1910 of actions that may be performed on the client for different error states in an embodiment in accordance with the techniques herein. The status information 1902 illustrates information that may be returned, for example, in the response of step 1508 of FIG. 19. For purposes of illustration, assume that SP A is a healthy master SP and SP B is an unhealthy peer SP. The information in 1902 may be obtained by issuing a proxy request to SP B through SP A. The AWS executing on the unhealthy SP of the data storage system may retrieve log information. Code executing on the unhealthy SP and/or client may analyze the log information to determine that status of different hardware and/or software of the unhealthy SP. For example, status information 1902 may include information regarding the devices of the unhealthy SP B. In this example, the information 1902 may indicate that device 1, corresponding to the SSD of the unhealthy SP B, has an associated hardware error state denoted as E2. The information 1902 may indicate that device 2, corresponding to the boot device of the unhealthy SP B, has an OK hardware status. It should be noted that the error state E2 may be included in the log information or otherwise derived from analyzing the log information or other data collected from the unhealthy SP B regarding its status. Based on the error state E2, the GUI may perform processing to determine what actions to take with respect to updating the displayed GUI and associated functionality. In this example, a table 1910 may be used. The table 1910 may include a column 1912 of possible error states and a column 1914 of corresponding actions. The actions are taken with respect to the GUI. Each row of the table 1910 indicates what action to take for an associated error state. In this example for an error state of E2, the row indicated by 1910a is selected by the GUI. The actions associated with 1910a include disabling operations associated with menu items A and B, displaying an error message denoted as E-MSG1, and bolding menu items for reimaging and rebooting the unhealthy SP B. The information represented in 1910 may be in other forms usable by the code executing on the client in connection with performing the techniques herein Continuing with the example of FIG. 19 where SP A is healthy and SP B is unhealthy, the GUI of FIG. 22 may be displayed on the management system. The example 2000 is the result of the code of the GUI implementing the action of 1910a of FIG. 21 for error state E2. Area 2002 is a portion of the display for alert messages. Area 2002 includes alert message 2004 indicating that the peer SP is in a degraded or unhealthy state requiring attention and corrective action. The message 2004 provides additional information regarding the type of error and the device ("SSD HARDWARE ERROR") as may be obtained from the log information. Furthermore, the message 2004 also describes and suggests possible corrective actions for this error state ("MAY NEED TO REPLACE SSD DEVICE, RE-IMAGE, AND REBOOT PEER SP"). Alert message 2004 may correspond to the message E-MSG1 of 1910a regarding the particular device, the SSD. Area 2010 is a portion of the display for menu items. In accordance with the actions of 1910a, menu items A and B are disabled as indicated by the "X" therethrough. An embodiment may denote disabled or inactive menu items, for example, by graying out or removing the menu items. Area 2020 may include a menu with proxy commands that may be issued to the unhealthy peer SP B via proxy through SP A. In accordance with the actions of 1910a, menu items 2022a and 2022b may be bolded to indicate or suggest possible corrective actions to be taken to restore SP B to a healthy state.

Figure 23:
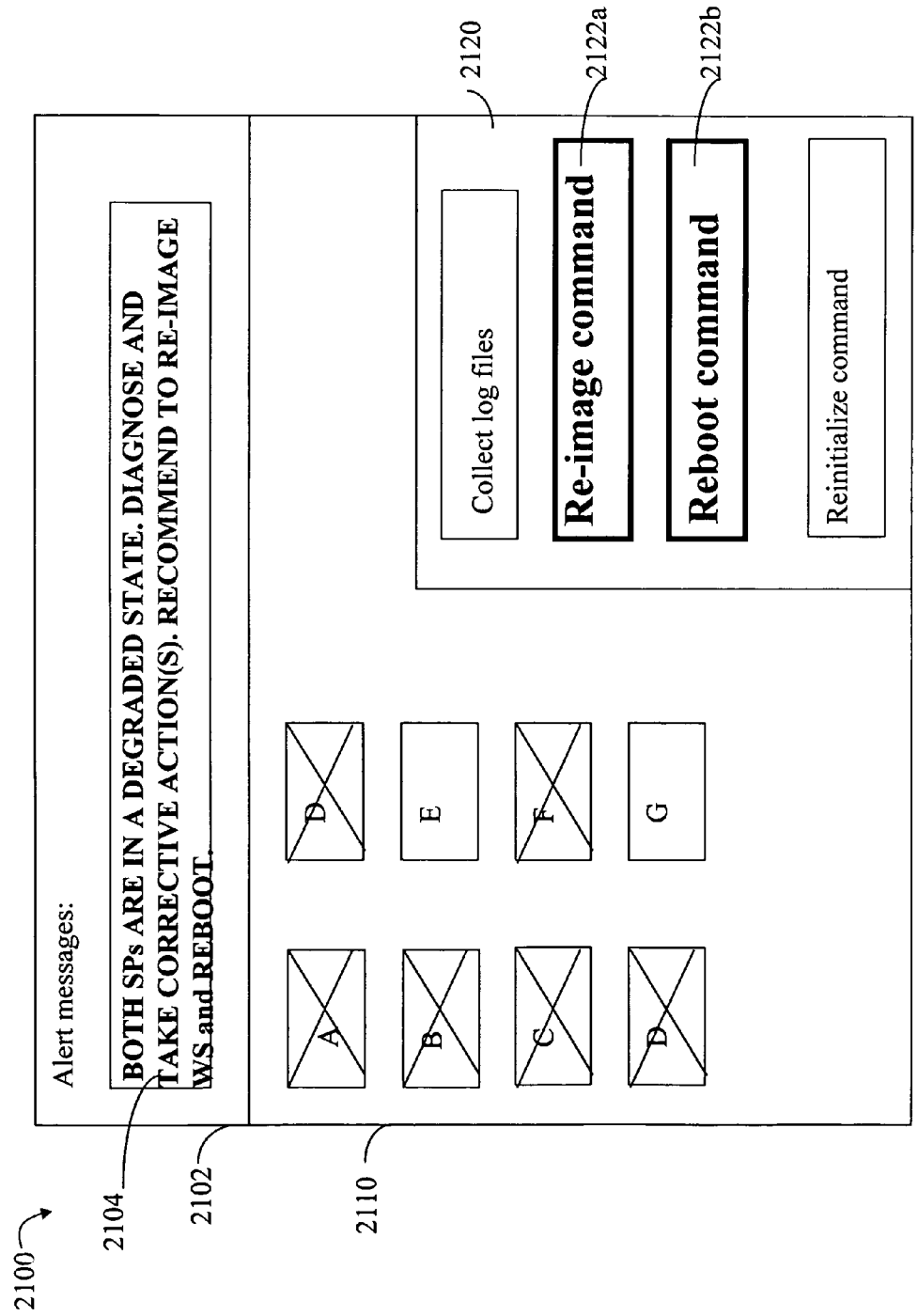

Referring to FIG. 23, shown is another example of a displayed GUI in an embodiment performing the techniques herein. The example 2100 includes an area 2102 where alert messages are displayed and area 2110 where menu items are displayed. The example 2100 illustrates a display that may result when both SPs of the data storage system are unhealthy as indicated by message 2104 and illustrated in connection with FIG. 7. Area 2110 indicates that only commands associated with menu items E and G are currently enabled. Area 2120 may include a menu with commands that may be issued directly to the unhealthy master SP. Suggested corrective actions that may be taken to place the unhealthy master SP in a healthy state are indicated by the bolded menu items 2122a and 2122b. In this example, note that the message of 2104 does not indicate a hardware error as may be determined by examining collected log information from the unhealthy master SP. Thus, using a table of actions similar to that illustrated in FIG. 21, code of the GUI (e.g., client code) executing on the management system may determine appropriate actions to be taken with respect to the displayed GUI resulting in the example of FIG. 23.

In accordance with techniques herein, code of the client may automatically track the state of the data storage system and accordingly perform appropriate processing. For an unhealthy SP, such processing may include obtaining and analyzing information regarding the status of the unhealthy SP, determining actions to be taken in response to different error states, and updating the displayed GUI. Thus, the user may be provided with a GUI which is responsive to changes in the data storage system state where the changes are automatically tracked and where appropriate responses to changes are automatically determined. The client-side processing described is automatic in that the processing may be performed in response to detected data storage system state changes without requiring user interaction.

The client may perform processing automatically as described herein in response to one or more selected changes in data storage system state information. The particular changes which may trigger the client-side processing may be more generally referred to as trigger events or conditions.

It should be noted that the techniques herein have been described with reference to managing a data storage system. The techniques herein may also be used more generally in connection with management of other systems besides data storage systems.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of processing data storage system management requests comprising:
providing a data that is a single data storage array including a plurality of service processors for processing data storage system management requests, each of said plurality of service processors executing data storage system management server code, said data storage system management server code including a web server;
designating a single one of said plurality of service processors as an active service processor and a remainder of said plurality of service processors as passive service processors;
receiving, at said data storage system, a data storage system management request for status information about a first of said plurality of service processors from a client on a network connection, said data storage system management request being processed by the active service processor, wherein, said first service processor currently designated as the active service processor becomes unhealthy and a second of said plurality of service processors which is designated as passive and is healthy is automatically selected as the active service processor replacing the first service processor, subsequent communications for data storage system management being transmitted over the network connection between the client and a web server executing on whichever service processor is currently designated as the active service processor, wherein tile client communicates over a same single network connection, the network connection, with whichever one of the plurality of service processors is designated as the active service processor thereby using the same single network connection for transmission of data storage management requests between the client and the data storage array when the first service processor is designated as the active service processor and also when the second service processor is designated as the active service processor;
processing; by the second service processor, the data storage system management request requesting status information about said first service processor;
issuing a request for the status information from the second service processor to the first service processor;
executing; in response to receiving said request at the first service processor, a command on the first service processor to obtain the status information;
returning the status information from the first service processor to the second service processor; and
returning the status information to the client from the second service processor;
wherein, each service processor that is healthy executes a first instance of a first type of web server, and wherein each service processor that is unhealthy executes a second instance of a second type of web server, said second type of web server being able to process only a portion of a set of commands, said first type of web server being able to process said set of commands.

2. The method of claim 1, wherein said first service processor transitions to healthy and said second service processor transitions to unhealthy and a first web server executing on said first service processor acts as a proxy for data storage system management requests directed to said second service processor.

3. The method of claim 2, further comprising:
sending a first data storage system management request for said second service processor to said first web server, wherein said first web server sends said first data storage system management request to a second web server executing on said second service processor.

4. The method of claim 3, wherein said first data storage system management requestis transmitted between the first service processor and the second processor using an inter-service processor communication connection of the data storage system.

5. The method of claim 4, wherein a healthy service processor is able to process a set of data storage system management requests and said second web server is able to process a predetermined portion of said set of data storage system management requests used to service said second service processor when said second service processor is unhealthy.

6. The method of claim 4, wherein code executing on said first service processor automatically forwards, to the second service processor, received data storage system management requests that are directed to said second service processor.

7. The method of claim 2, wherein, in response to receiving a data storage system management request directed to said second service processor, code executing on said first service processor issues instructions to said second service processor in accordance with the data storage system management request directed to the second service processor to cause said second service processor to execute a command in the data storage system management request directed to the second service processor.

8. The method of claim 1, wherein said portion includes commands used to diagnose problems on an unhealthy service processor and take corrective actions to transition a service processor which is an unhealthy state to a healthy state.

9. The method of claim 1, wherein said portion includes a first command to collect information regarding a service processor on which said second instance is executing, a second command to reboot the service processor on which said second instance is executing, a third command to re-image code used by the service processor on which said second instance is executing, and a fourth command to perform reinitialization in connection with the data storage system management server code executing on the service processor on which the second instance is executing.

10. The method of claim 8, wherein said first service processor transitions to healthy and said second service processor transitions to unhealthy, and a first web server of said first type executing on said first service processor acts as a proxy for data storage system management requests directed to said second service processor.

11. The method of claim 10, wherein said first web server communicates with a second web server of said second type executing on said second service processor.

12. The method of claim 1, wherein each of the plurality of service processors transitions to unhealthy and one of the plurality of service processors that is unhealthy is designated as the active service processor and communicates with the client until one of the plurality of service processors becomes healthy.

13. The method of claim 1, wherein a service processor is determined as healthy in accordance with one or more criteria, a service processor determined as healthy being able to service a set of expected data storage system management requests over the network connection used for data storage management and a service processor determined as unhealthy being able to service a portion of said set.

14. The method of claim 13, wherein said one or more criteria for determining whether a service processor is healthy include at least one of: whether a web server of said first type which is able to service any request in the set is loaded and running on the service processor, whether the web server of the first type is able to successfully communicate over an external network connection which is said network connection used for data storage system management transmissions, whether data storage system management server code executing on the service processor is able to communicate with other peer service processors using an inter-service processor communication connection of the data storage system, and whether code for proxying to a peer service processor is executing on the service processor.

15. A non-transitory computer readable medium comprising executable code stored thereon for processing data storage system management requests, the computer readable medium comprising: executable code for:
designating a single one of a plurality of service processors as an active service processor and a remainder of said plurality of service processors as passive service processors, said plurality of service processors being included in a data storage system that is a single data storage array, said plurality of service processors processing data storage system management requests, each of said plurality of service processors executing data storage system management server code, said data storage system management server code including a web server; and
receiving, at the data storage system, a data storage system management request from a client on a network connection for status information about a first of said plurality of service processors, said data storage system management request being processed by the active service processor, wherein, said first service processor currently designated as the active service processor becomes unhealthy and a second of said plurality of service processors which is designated as passive and is healthy as the active service processor replacing the first service processor, subsequent communications for data storage system management being transmitted over the network connection between the client and a web server executing on whichever service processor is currently designated as the active service processor, wherein the client communicates over a same single network connection, the network connection, with whichever one of the plurality of service processors is designated as the active service processor thereby using the same single network connection for transmission of data storage management requests between the client and the data storage array when the first service processor is designated as the active service processor and also when the second service processor is designated as the active service processor;
processing, by the second service processor, the data storage system management request requesting status information about said first service processor;
issuing a request for the status information from the second service processor to the first service processor;
executing, in response to receiving said request at the first service processor, a command on the first service processor to obtain the status information;
returning the status information from the first service processor to the second service processor; and
returning the status information to the client from the second service processor;
wherein, each service processor that is healthy executes a first instance of a first type of web server, and wherein each service processor that is unhealthy executes a second instance of a second type of web server, said second type of web server being able to process only a portion of a set of commands, said first type of web server being able to process said set of commands.

16. The non-transitory computer readable medium of claim 15, wherein said first service processor transitions to healthy and said second service processor transitions to unhealthy and a first web server executing on said first service processor acts as a proxy for data storage system management requests directed to said second service processor, and wherein a first data storage system management request for said second service processor is received by said first web server, wherein said first web server sends said first data storage system management request to a second web server executing on said second service processor.

17. The non-transitory computer readable medium of claim 16, wherein said first data storage system management request is transmitted between the first service processor and the second processor using an inter-service processor communication connection of the data storage system, and wherein said second web server is able to process a predetermined portion of data storage system management requests used to service said second service processor when said second service processor is unhealthy.

18. A method for processing data storage, system management requests comprising:
- designating a single one of a plurality of service processors as an active service processor and a remainder of said plurality of service processors as passive service processors, said plurality of service processors being included in a data storage system that is a single data storage array, said plurality of service processors processing data storage system management requests, each of said plurality of service processors executing data storage system management server code, said data storage system management server code including a web server;
- receiving, at the data storage system, a data storage system management request from a client on a network connection, said data storage system management request being processed by the active service processor, wherein, a first service processor currently designated as the active service processor becomes unhealthy and a second of said plurality of service processors which is designated as passive and is healthy is automatically selected as the active service processor replacing the first service processor, wherein the client communicates over a same single network connection, the network connection, with whichever one of the plurality of service processors is designated as the active service processor thereby using the same single network connection for transmission of data storage management requests between the client and the data storage array when the first service processor is designated as the active service processor and also when the second service processor is designated as the active service processor; and
- processing, by the second service processor, the data storage system management request requesting status information about said first service processor, wherein said processing further includes:
  - issuing a request for the status information from a first web server of the second service processor to a second web server of the first service processor;
  - executing, in response to receiving said request, a command on the first service processor to obtain the status information;
  - returning, from the second web server to the first web server, the status information; and
  - returning, from the first web server to the client, the status information;
- wherein, each service processor that is healthy executes a first instance of a first type of web server, and wherein each service processor that is unhealthy executes a second instance of a second type of web server, said second type of web server being able to process only a portion of a set of commands, said first type of web server being able to process said set of commands.

* * * * *